US010495820B1

(12) United States Patent
Whaley

(10) Patent No.: US 10,495,820 B1
(45) Date of Patent: Dec. 3, 2019

(54) METHOD AND APPARATUS FOR LOW-PROFILE FIBER-COUPLING TO PHOTONIC CHIPS

(71) Applicant: Lockheed Martin Corporation, Bethesda, MD (US)

(72) Inventor: Gregory J. Whaley, Woodbury, MN (US)

(73) Assignee: Lockheed Martin Corporation, Bethesda, MD (US)

(*) Notice: Subject to any disclaimer, the term of this patent is extended or adjusted under 35 U.S.C. 154(b) by 1532 days.

(21) Appl. No.: 13/999,557

(22) Filed: Jun. 17, 2014

(51) Int. Cl.
*G02B 6/36* (2006.01)
(52) U.S. Cl.
CPC .................. *G02B 6/3636* (2013.01)
(58) Field of Classification Search
CPC .................................................. G02B 6/3636
USPC ........................................................... 385/89
See application file for complete search history.

(56) References Cited

U.S. PATENT DOCUMENTS

| | | | |
|---|---|---|---|
| 4,575,181 A | 3/1986 | Ishikawa | |
| 4,894,127 A | 1/1990 | Wong et al. | |
| 5,080,503 A | 1/1992 | Najafi et al. | |
| 5,136,818 A | 8/1992 | Bramson | |
| 5,334,559 A | 8/1994 | Hayden | |
| 5,336,366 A | 8/1994 | Cain et al. | |
| 5,907,436 A | 5/1999 | Perry et al. | |
| 6,295,404 B1 | 9/2001 | Ichigi et al. | |
| 6,330,388 B1 | 12/2001 | Bendett et al. | |
| 6,493,476 B2 | 12/2002 | Bendett | |
| 6,754,006 B2 | 6/2004 | Barton et al. | |
| 6,768,850 B2 | 7/2004 | Dugan et al. | |
| 6,813,405 B1 | 11/2004 | Bendett et al. | |
| 6,905,627 B2 | 6/2005 | Wei et al. | |
| 7,149,399 B2 | 12/2006 | Meder et al. | |
| 7,199,924 B1 | 4/2007 | Brown et al. | |
| 7,391,561 B2 | 6/2008 | Di Teodoro et al. | |
| 7,429,734 B1 | 9/2008 | Tidwell | |
| 7,471,705 B2 | 12/2008 | Gerstenberger et al. | |
| 7,517,159 B1 | 4/2009 | Rolston et al. | |
| 7,522,807 B2 | 4/2009 | Rolston et al. | |
| 7,537,394 B2 | 5/2009 | Rolston et al. | |
| 7,539,231 B1 | 5/2009 | Honea et al. | |
| 7,570,856 B1 | 8/2009 | Minelly | |
| 7,768,700 B1 | 8/2010 | Savage-Leuchs | |
| 7,835,608 B2 | 11/2010 | Minelly et al. | |
| 7,876,498 B1 | 1/2011 | Honea et al. | |
| 7,876,803 B1 | 1/2011 | Di Teodoro et al. | |
| 7,924,500 B1 | 4/2011 | Minelly | |

(Continued)

*Primary Examiner* — Mark Hellner
(74) *Attorney, Agent, or Firm* — Charles A. Lemaire; Jonathan M. Rixen; Lemaire Patent Law Firm, P.L.L.C.

(57) ABSTRACT

Apparatus and method for clamping optical fibers to a photonic chip. Some embodiments include a transparent second plate; a grooved first plate; and a plurality of optical fibers held between the first plate and the second plate, wherein each optical fiber has a core, a cladding layer, and an end facet that reflects light from the core through a first region of the cladding layer and out of the respective optical fiber and through the transparent second plate. The first region has a higher index of refraction than the first cladding layer surrounding the first region. Some embodiments include a method for making the apparatus. Some embodiments include a method for using the apparatus.

27 Claims, 6 Drawing Sheets

(56) References Cited

U.S. PATENT DOCUMENTS

| | | |
|---|---|---|
| 8,002,477 B2 * | 8/2011 | Colgan ................ G02B 6/3636 385/120 |
| 8,179,594 B1 | 5/2012 | Tidwell |
| 8,202,268 B1 | 6/2012 | Wells et al. |
| 8,355,608 B2 | 1/2013 | Hu |
| 8,411,712 B2 | 4/2013 | Honea et al. |
| 8,441,718 B2 | 5/2013 | Mead |
| 8,503,840 B2 | 8/2013 | Hu et al. |
| 8,736,953 B2 | 5/2014 | Savage-Leuchs |
| 8,755,649 B2 | 6/2014 | Yilmaz et al. |
| 8,767,286 B2 | 7/2014 | Savage-Leuchs |
| 2003/0185514 A1 | 10/2003 | Bendett et al. |
| 2010/0111478 A1 | 5/2010 | Fujiyama |
| 2011/0122895 A1 | 5/2011 | Savage-Leuchs |
| 2011/0249320 A1 | 10/2011 | Savage-Leuchs |

* cited by examiner

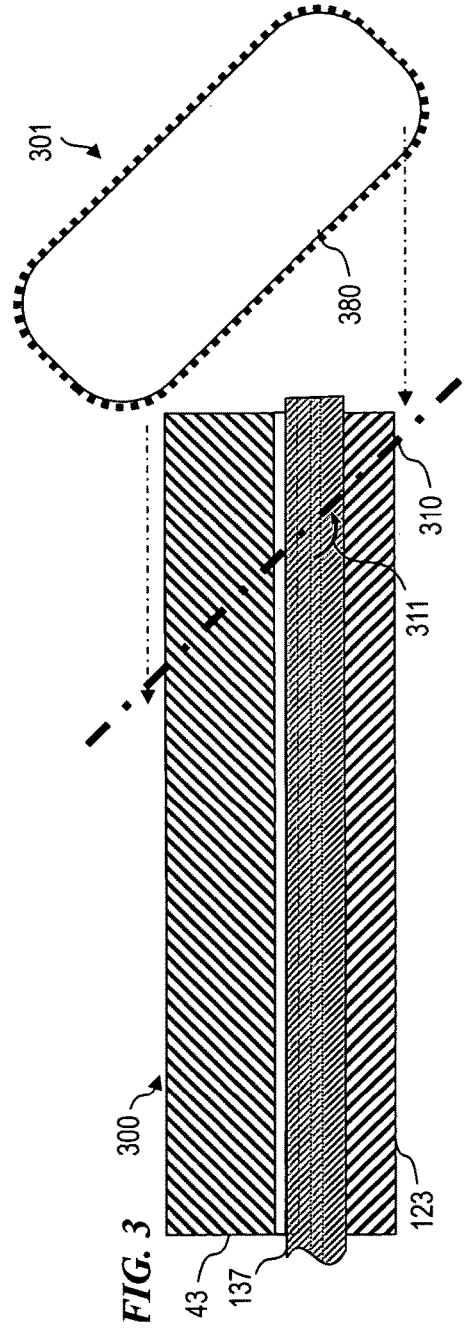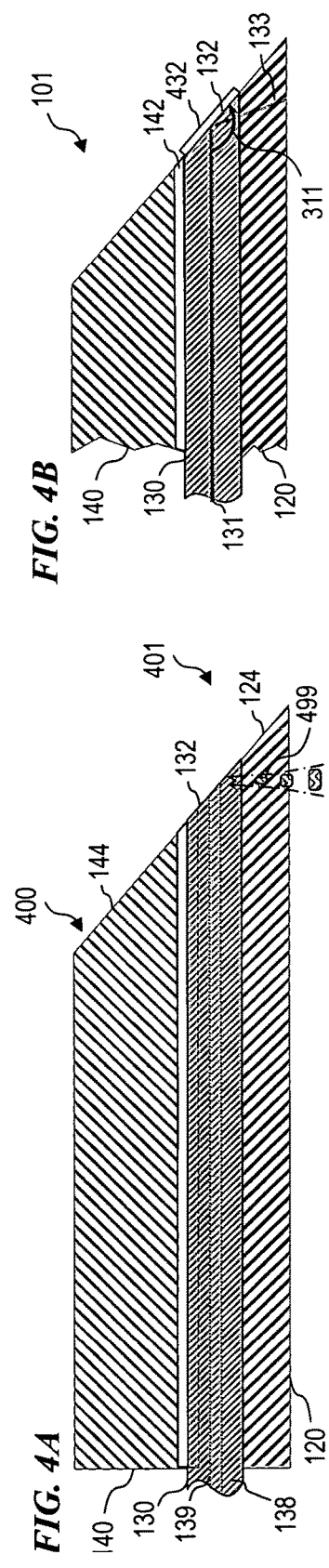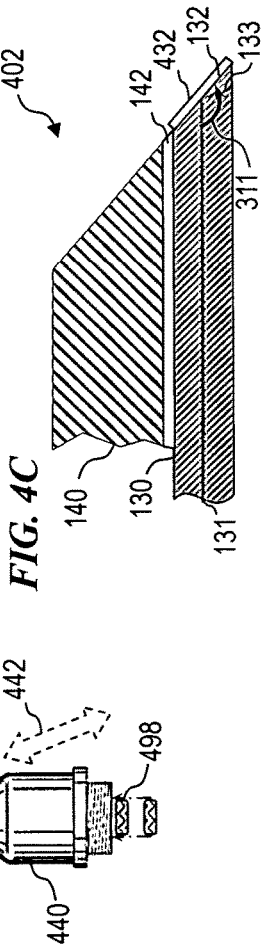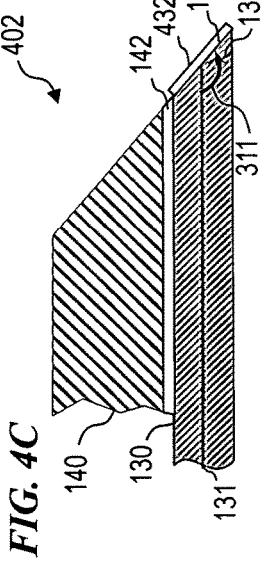

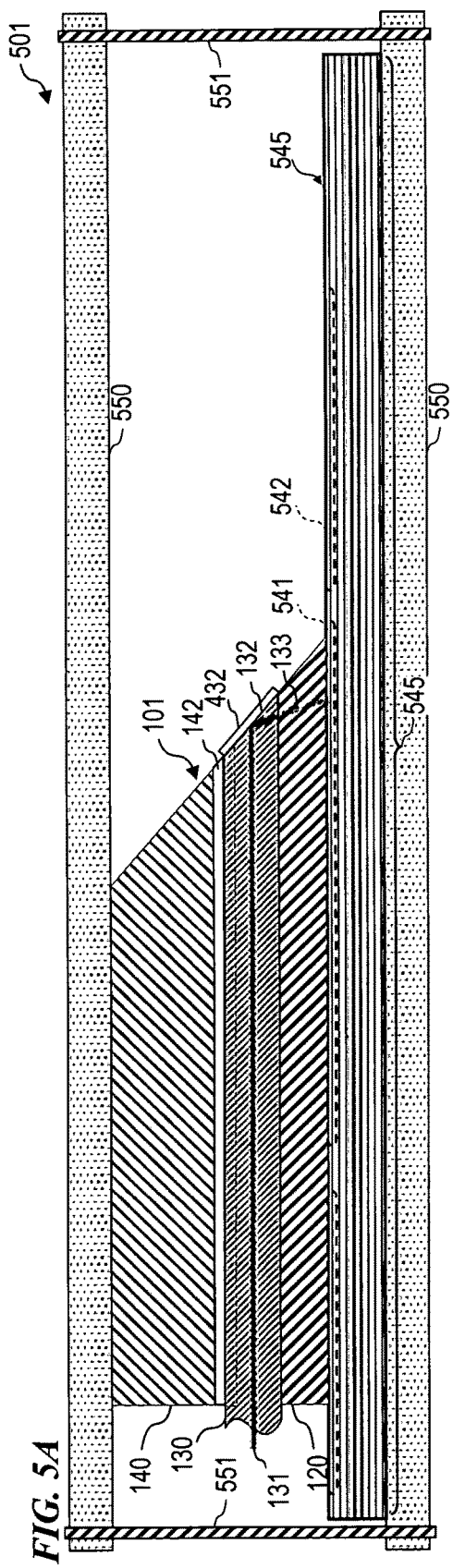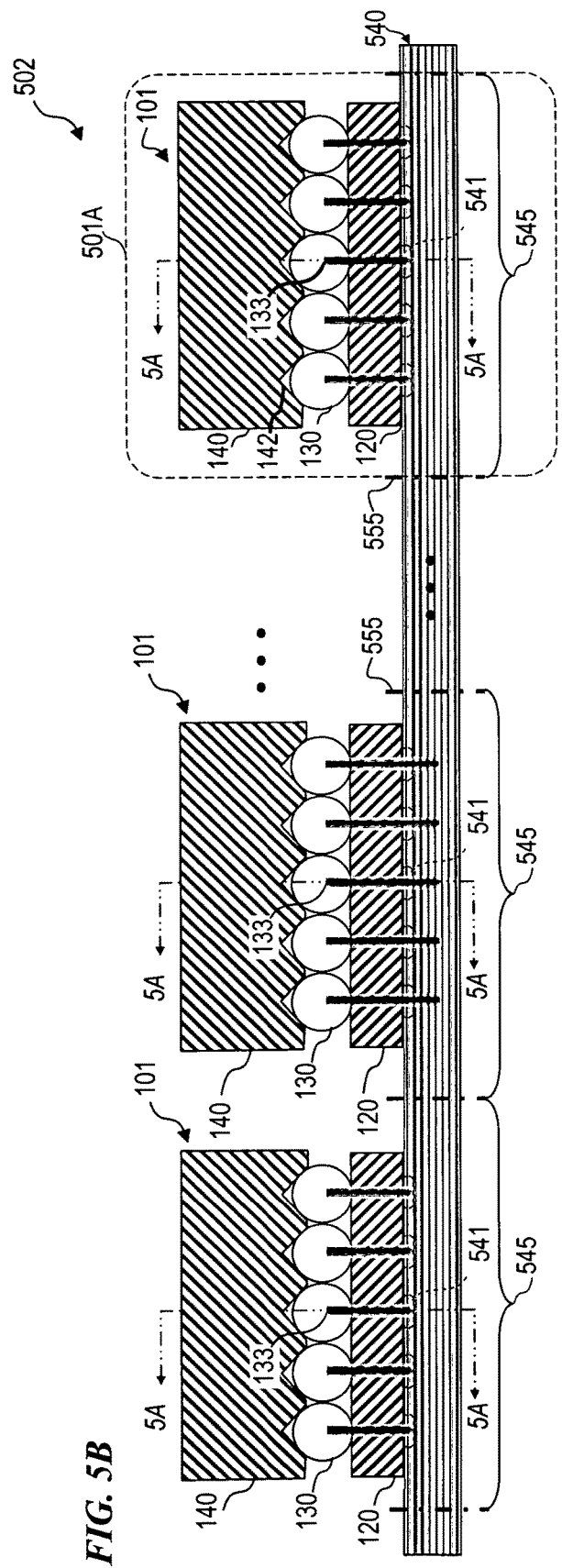

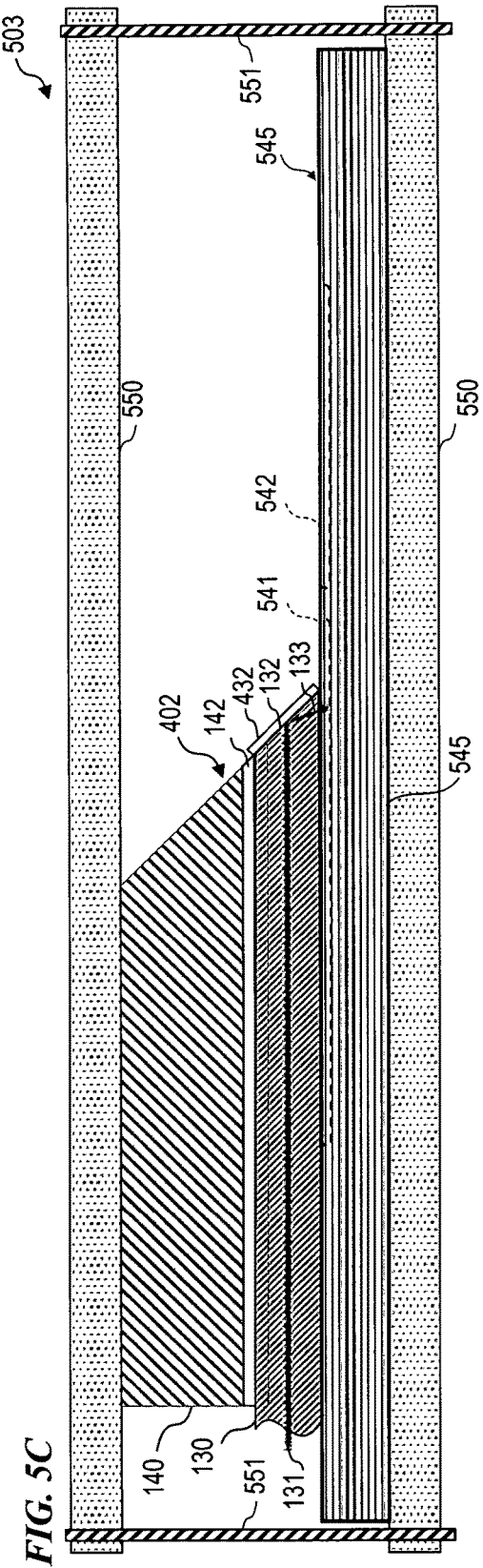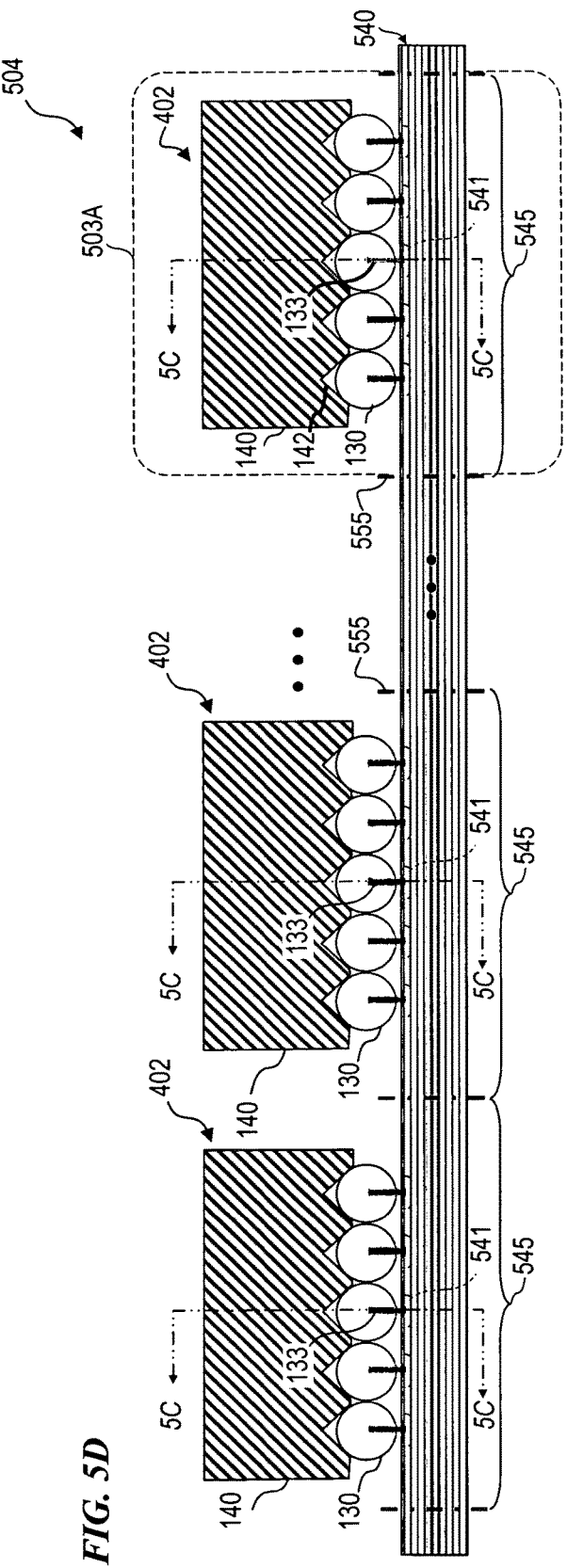
FIG. 5C
FIG. 5D

METHOD AND APPARATUS FOR LOW-PROFILE FIBER-COUPLING TO PHOTONIC CHIPS

FIELD OF THE INVENTION

The invention relates generally to optical waveguides, and more particularly to apparatus and methods for coupling light between a photonic chip and a plurality of optical fibers, and for clamping the plurality of optical fibers in one or more clamping units to the photonic chip, wherein some embodiments provide an enhanced signal path through which signal light that is reflected by the end facet of an optical fiber can exit through a side wall of the fiber, and wherein some embodiments provide an all-glass path for the reflected light between each fiber and the photonic chip and/or a waveguide path for signal light that extends from the core of each fiber through the transparent plate to its interface with the photonics chip.

BACKGROUND OF THE INVENTION

Photonic integrated circuits (PICs; also called photonic chips) are often formed using photolithographic techniques, wherein dopants (such as lasing species and index-of-refraction modifiers) are diffused into a glass or silicon substrate through a mask. Some PICs include surface features such as diffraction gratings. Lasers, optical couplers, resonators, add-drop ports, interferometers, and the like can be manufactured into PICs. Some hybrid optical-electrical PICs also include electronic circuits. A large number of such photonic integrated circuits can be simultaneously fabricated onto a wafer substrate, then tested and diced into individual PICs.

The telecommunications industry commonly uses optical fibers to transmit large amounts of data in a short time. One common light source for optical-fiber communications systems is a laser formed using erbium-doped glass. One such system uses erbium-doped glass fibers to form a laser that emits at a wavelength of about 1.536 micrometer and is pumped by an infrared source operating at a wavelength of about 0.98 micrometer. One method usable for forming waveguides in a substrate is described in U.S. Pat. No. 5,080,503 issued Jan. 14, 1992 to Najafi et al., which is hereby incorporated by reference. A phosphate glass useful in lasers is described in U.S. Pat. No. 5,334,559 issued Aug. 2, 1994 to Joseph S. Hayden, which is also hereby incorporated by reference. An integrated optic laser is described in U.S. Pat. No. 5,491,708 issued Feb. 13, 1996 to Malone et al., which is also hereby incorporated by reference.

Exemplary patents describing various PICs include the following three patents and patent application invented by Bendett and Whaley et al.

United States Patent Publication 20030185514 by Bendett and Whaley published on Oct. 2, 2003 with the title "Method and apparatus for tapping a waveguide on a substrate," and is incorporated herein by reference. In Patent Publication 20030185514, Bendett et al. describe an integrated photonic apparatus that includes a glass substrate having a major surface, a first waveguide segment and a second waveguide segment, and a optical tap or port that extracts a portion of the light from the first waveguide segment into the second waveguide segment, and emits that light from a surface of the substrate. In some embodiments, a wavelength-selective evanescent coupler and/or a wavelength-selective optical diffraction grating perform a selection of one or more wavelengths to exit from the port.

U.S. Pat. No. 6,330,388 issued to Bendett et al. on Dec. 11, 2001 with the title "Method and apparatus for waveguide optics and devices," and is incorporated herein by reference. In U.S. Pat. No. 6,330,388, Bendett et al. describe optical structures and a method for producing tunable waveguide lasers. In one embodiment, a waveguide is defined within a glass substrate doped with a rare-earth element or elements by ion diffusion. Feedback elements such as mirrors or reflection gratings in the waveguide further define a laser-resonator cavity so that laser light is output from the waveguide when pumped optically or otherwise.

U.S. Pat. No. 6,493,476 issued to Bendett on Dec. 10, 2002 with the title "Apparatus and method for integrated photonic devices having gain and wavelength-selectivity," and is incorporated herein by reference. In U.S. Pat. No. 6,493,476, Bendett describes an integrated photonic apparatus that includes a glass substrate having a major surface, wherein the glass substrate includes a plurality of regions, each region having a different index of refraction, including a first region having a first index of refraction and a second region having a second index of refraction lower than the first index of refraction, and a first waveguide formed along the major surface of the substrate, wherein the first waveguide has a higher index of refraction than an intrinsic index of refraction of adjacent portions of the substrate, and wherein the first waveguide passes through the first region and through the second region of the glass substrate.

U.S. Pat. No. 6,813,405 issued to Bendett and Whaley on Nov. 2, 2004 with the title "Compact apparatus and method for integrated photonic devices having folded directional couplers," and is incorporated herein by reference. In U.S. Pat. No. 6,813,405, Bendett et al. describe an integrated photonic apparatus that includes a glass substrate having a major surface, a first waveguide segment and a second waveguide segment, and a folded evanescent coupler connecting the first waveguide segment to the second. The folded evanescent coupler is formed by a first length of the first waveguide segment and an equivalent length portion of the second waveguide running parallel and adjacent to the first waveguide segment. The first length is substantially equal to one half of an evanescent-coupler length needed to transfer a first wavelength in a non-folded evanescent coupler. A reflector (e.g., dielectric mirror that is highly reflective to light of the first wavelength and also highly transmissive to light of a second wavelength) is located at an end of the folded evanescent coupler. The first length is selected to transfer substantially all light of a first wavelength.

U.S. Pat. No. 4,575,181 (hereinafter, "Ishikawa"), titled "OPTICAL FIBER ASSEMBLY WITH CLADDING LIGHT SCATTERING MEANS", issued Mar. 11, 1986, and is incorporated herein by reference. Ishikawa describes an optical fiber having a core and a cladding that is covered with a protecting film. The film is removed in a predetermined region extending from the end face of the optical fiber along the optical fiber, and the cladding is exposed. The surface of the exposed cladding is formed with a rough surface, and a laser beam which is transmitted to the cladding is scattered externally from the rough surface. The optical fiber is mounted on the hollow holder, and the rough surface of the cladding is disposed in the holder. The beam component scattered externally from the rough surface is absorbed by the light absorbing layer on the inner surface of the holder.

The present invention can also be used with or in the inventions described in the following patents and patent applications: U.S. Pat. No. 5,336,366 (hereinafter, "Cain et al."), titled "NEW DRY ETCH TECHNIQUE", issued Aug.

9, 1994; U.S. Pat. No. 6,905,627 (hereinafter, "Wei et al."), titled "ETCHING METHOD FOR FABRICATING HIGH QUALITY OPTICAL FIBER PROBE", issued Jun. 14, 2005; U.S. Pat. No. 5,136,818 (hereinafter, "Bramson"), titled "METHOD OF POLISHING OPTICAL FIBER", issued Aug. 11, 1992; U.S. Pat. No. 4,894,127 (hereinafter, "Wong et al."), titled "METHOD FOR ANODIZING ALUMINUM", issued Jan. 16, 1990; and U.S. Pat. Nos. 7,429,734, 7,471,705, and 7,539,231; U.S. patent application Ser. No. 11/688,854 (which issued as U.S. Pat. No. 7,835,608 on Nov. 16, 2010), and Ser. No. 12/624,327 (which issued as U.S. Pat. No. 8,441,718 on May 14, 2013); and U.S. Provisional Patent Application Ser. No. 61/263,736; which are each incorporated herein by reference.

The present invention can also be used with or in the inventions described in the following patents and patent applications:

U.S. patent application Ser. No. 11/342,336 by Andrew J. W. Brown et al. filed Jan. 26, 2006, titled "APPARATUS AND METHOD FOR SPECTRAL-BEAM COMBINING OF HIGH-POWER FIBER LASERS" (U.S. Pat. No. 7,199,924);

U.S. patent application Ser. No. 11/420,729 by Fabio Di Teodoro et al. filed May 26, 2006, titled "FIBER-OR ROD-BASED OPTICAL SOURCE FEATURING A LARGE-CORE, RARE-EARTH-DOPED PHOTONIC-CRYSTAL DEVICE FOR GENERATION OF HIGH-POWER PULSED RADIATION AND METHOD" (U.S. Pat. No. 7,391,561);

U.S. patent application Ser. No. 11/567,740 by John D. Minelly et al. filed Dec. 7, 2006, titled "APPARATUS AND METHOD FOR AN ERBIUM-DOPED FIBER FOR HIGH PEAK-POWER APPLICATIONS" (U.S. Pat. No. 7,570,856);

U.S. patent application Ser. No. 11/565,619 by Matthias P. Savage-Leuchs filed Nov. 30, 2006, titled "METHOD AND APPARATUS FOR OPTICAL GAIN FIBER HAVING SEGMENTS OF DIFFERING CORE SIZES" (U.S. Pat. No. 7,768,700);

U.S. patent application Ser. No. 12/053,551 by Fabio Di Teodoro et al. filed Mar. 21, 2008, titled "HIGH-POWER, PULSED RING FIBER OSCILLATOR AND METHOD" (U.S. Pat. No. 7,876,803);

U.S. patent application Ser. No. 12/054,375 by Eric C. Honea et al. filed Mar. 24, 2008, titled "PULSE-ENERGY-STABILIZATION APPROACH AND FIRST-PULSE-SUPPRESSION METHOD USING FIBER AMPLIFIER" (U.S. Pat. No. 7,876,498);

U.S. patent application Ser. No. 12/165,651 by Tidwell, et al. that issued May 15, 2012 with the title "METHOD AND APPARATUS FOR SPECTRAL-BEAM COMBINING OF FANNED-IN LASER BEAMS WITH CHROMATIC-DISPERSION COMPENSATION USING A PLURALITY OF DIFFRACTIVE GRATINGS" (U.S. Pat. No. 8,179,594);

U.S. patent application Ser. No. 12/169,628 by John D. Minelly filed Jul. 8, 2008, titled "MICRO-STRUCTURED FIBER PROFILES FOR MITIGATION OF BEND-LOSS AND/OR MODE DISTORTION IN LMA FIBER AMPLIFIERS, INCLUDING DUAL-CORE EMBODIMENTS" (U.S. Pat. No. 7,924,500);

U.S. patent application Ser. No. 12/050,937 titled "A METHOD AND MULTIPLE-MODE DEVICE FOR HIGH-POWER SHORT-PULSE-LASER ABLATION AND CW CAUTERIZATION OF BODILY TISSUES" filed Mar. 18, 2008 by Jonathon Wells et al. (U.S. Pat. No. 8,202,268);

U.S. patent application Ser. No. 12/952,190 by Matthias P. Savage-Leuchs et al. filed Nov. 22, 2010, titled "Q-SWITCHED OSCILLATOR SEED-SOURCE FOR MOPA LASER ILLUMINATOR METHOD AND APPARATUS" (U.S. Pub. 2011/0122895, which issued as U.S. Pat. No. 8,934,509 on Jan. 13, 2015);

U.S. patent application Ser. No. 13/085,354 by Matthias P. Savage-Leuchs filed Apr. 12, 2011, titled "HIGH-POWER LASER SYSTEM HAVING DELIVERY FIBER WITH NON-CIRCULAR CROSS SECTION FOR ISOLATION AGAINST BACK REFLECTIONS" (U.S. Pat. No. 8,736,953);

U.S. patent application Ser. No. 13/085,411 by Matthias P. Savage-Leuchs et al. filed Apr. 12, 2011, titled "HIGH BEAM QUALITY AND HIGH AVERAGE POWER FROM LARGE-CORE-SIZE OPTICAL-FIBER AMPLIFIERS" (U.S. Pub. 2011/0249320, which issued as U.S. Pat. No. 8,830,568 on Sep. 9, 2014);

U.S. patent application Ser. No. 13/085,462 by Matthias P. Savage-Leuchs et al. filed Apr. 12, 2011, titled "SIGNAL AND PUMP MODE-FIELD ADAPTOR FOR DOUBLE-CLAD FIBERS AND ASSOCIATED METHOD" (U.S. Pub. 2011/0249321, which issued as U.S. Pat. No. 8,767,286 on Jul. 1, 2014);

U.S. patent application Ser. No. 12/854,868 by Tolga Yilmaz et al. filed Aug. 11, 2010, titled "IN-LINE FORWARD/BACKWARD FIBER-OPTIC SIGNAL ANALYZER" (U.S. Pub. 2011/0091155, which issued as U.S. Pat. No. 8,755,649 on Jun. 17, 2014);

U.S. patent application Ser. No. 12/793,508 by Yongdan Hu filed Jun. 3, 2010, titled "METHOD AND APPARATUS FOR IN-LINE FIBER-CLADDING-LIGHT DISSIPATION" (U.S. Pat. No. 8,355,608);

U.S. patent application Ser. No. 13/085,465 by Eric C. Honea et al. filed Apr. 12, 2011, titled "BEAM DIAGNOSTICS AND FEEDBACK SYSTEM AND METHOD FOR SPECTRALLY BEAM-COMBINED LASERS" (U.S. Pat. No. 8,411,712);

U.S. patent application Ser. No. 12/861,773 by Yongdan Hu et al. filed Aug. 23, 2010, titled "OPTICAL-FIBER ARRAY METHOD AND APPARATUS" (U.S. Pat. No. 8,503,840);

U.S. patent application Ser. No. 14/086,744 by Eric C. Honea et al. filed Nov. 21, 2013, titled "FIBER AMPLIFIER SYSTEM FOR SUPPRESSION OF MODAL INSTABILITIES AND METHOD" (which issued as U.S. Pat. No. 9,214,781 on Dec. 15, 2015);

U.S. patent application Ser. No. 13/987,265 by Eric C. Honea et al. filed Feb. 18, 2014, titled "APPARATUS AND METHOD FOR FIBER-LASER OUTPUT-BEAM SHAPING FOR SPECTRAL BEAM COMBINATION" (which issued as U.S. Pat. No. 9,366,872 on Jun. 14, 2016);

U.S. Provisional Patent Application 61/877,796 by Andrew Xing et al. filed Sep. 13, 2013, titled "APPARATUS AND METHOD FOR A DIAMOND SUBSTRATE FOR A MULTI-LAYERED DIELECTRIC DIFFRACTION GRATING";

U.S. Provisional Patent Application 61/854,277 filed Apr. 30, 2014 by Yongdan Hu et al. titled "SYSTEM AND METHOD FOR HIGH-POWER, HIGH-STRAYLIGHT-LOAD FIBER ARRAY"; each of which is incorporated herein by reference.

U.S. Pat. No. 6,295,404 to Takenori Ichigi et al. (hereinafter, "Ichigi et al.") titled "OPTICAL FIBER ARRAY", issued Sep. 25, 2001, and is incorporated herein by reference. Ichigi et al. describe an optical fiber array that includes a V-groove substrate for housing an uncovered glass fiber section formed at an end portion of an optical fiber contained therein. A lower covered section housing portion houses a covered section of the optical fiber and is formed to be deeper than the V-groove forming portion. An optical fiber is disposed so that the uncovered glass fiber section is housed in the V groove and the covered section is housed in the lower covered section housing portion. A lid substrate is composed of a glass fiber protective portion covering an upper surface of the uncovered glass fiber section and an upper covered section housing portion houses a covered section of the optical fiber. The upper covered section housing portion is formed to be deeper than the glass fiber protective portion and is disposed on the V-groove substrate. A resin is filled in the gaps among the V-groove substrate, the optical fiber, and the lid substrate and cured to give a unitary optical fiber array.

U.S. Pat. No. 7,149,399 to Martin G. Meder et al. (hereinafter, "Meder et al.") titled "GLASS BONDED FIBER ARRAY AND METHOD FOR THE FABRICATION THEREOF", issued Dec. 12, 2006, and is incorporated herein by reference. Meder et al. describe a fiber optic array that includes a substrate having a fiber support surface. The array further includes an optical fiber having a fiber portion that includes an un-jacketed, un-buffered optical core segment. The un-jacketed, un-buffered optical core segment is placed in contact with the fiber support surface to orient the optical core segment at a selected position relative to the support surface. In addition, the array includes a solder glass chemically bonded to the optical core segment and the fiber support surface so that the optical core segment is secured at a predetermined location relative to the support surface of the substrate. A method for fabricating such a fiber optic array is also provided.

U.S. Patent Publication 2010/0111478 to Takaharu Fujiyama (hereinafter, "Fujiyama") titled "NON-LINEAR FIBER ARRAY HAVING OPPOSING V-GROOVE STRUCTURES", published May 6, 2010, and is incorporated herein by reference. Fujiyama describes a fiber array unit (FAU) having plurality of optical transmission channels (e.g., fiber optics) terminating at a side surface thereof for carrying optical signals to and/or from waveguides in a planar lightwave circuit (PLC). The optical transmission channels of the FAU terminate at the side surface thereof in a non-linear, cross-sectional pattern (e.g., a curved pattern). The non-linear pattern is determined by a pattern of grooves formed in a substrate of the FAU, in combination with a lid which may also have an inverse, non-linear pattern, to thereby rigidly, reliably and permanently hold the optical transmission channels in place.

U.S. Pat. No. 6,754,006 titled "Hybrid metallic-dielectric grating" issued Jun. 22, 2004 to Barton et al. and is incorporated herein by reference. This patent describes a diffraction grating having a metallic base layer and layers of dielectric materials of varying refractive index, where a bottom interface of the layers is adherent to the metallic base layer. The dielectric layers are periodically spaced on top of the metallic base layer, leaving the metallic base layer exposed in regions. This grating allows for the polarization-insensitive reflective properties of the base metallic layer to operate in conjunction with the polarization sensitive diffraction properties of the multilayer grating structure to provide near 100% diffraction efficiency over a reasonable wavelength bandwidth, independent of the polarization of the incident beam.

U.S. Pat. No. 5,907,436 titled "Multilayer dielectric diffraction gratings" issued May 25, 1999 to Perry et al., and is incorporated herein by reference. This patent describes the design and fabrication of dielectric grating structures with high diffraction efficiency. The gratings have a multilayer structure of alternating index dielectric materials, with a grating structure on top of the multilayer, and obtain a diffraction grating of adjustable efficiency, and variable optical bandwidth.

U.S. Pat. No. 8,355,608 (listed above) issued to Yongdan Hu on Jan. 15, 2013 with the title "Method and apparatus for in-line fiber-cladding-light dissipation," and is incorporated herein by reference. In U.S. Pat. No. 8,355,608, Dr. Hu describes an apparatus and method for in-line cladding-light dissipation including forming a light-scattering surface on the optical fiber such that the light-scattering surface scatters cladding light away from the optical fiber. In some embodiments, the apparatus includes an optical fiber having a core and a first cladding layer that surrounds the core, wherein a first portion of the optical fiber has a light-scattering exterior surface. Some embodiments further include a transparent enclosure, wherein the transparent enclosure includes an opening that extends from a first end of the transparent enclosure to a second end of the transparent enclosure, and wherein at least the first portion of the optical fiber is located within the opening of the transparent enclosure. Some embodiments include a light-absorbing housing that surrounds the optical fiber and the transparent enclosure and is configured to absorb the light scattered away from the optical fiber by the light-scattering exterior surface.

U.S. Pat. No. 6,768,850 issued to Dugan, et al. on Jul. 27, 2004 with the title "Method of index trimming a waveguide and apparatus formed of the same" and is incorporated herein by reference. In U.S. Pat. No. 6,768,850 Dugan et al. describe a method of using a beam of ultra-short laser pulses, having pulse durations below 10 picoseconds, to adjust an optical characteristic within an optical medium is provided. The beams would have an intensity above a threshold for altering the index of refraction of a portion of the optical medium. The beams could be selectively applied to the optical medium and any structures formed or existing therein. Thus, the beam could be moved within a waveguide in the optical medium to alter the index of refraction of the waveguide forming any number of different longitudinal index of refraction profiles. The beam could also be moved within the optical medium near the waveguide to alter an effective index of refraction of a signal traveling within the waveguide.

U.S. Pat. No. 7,517,159 issued to Rolston et al. on Apr. 14, 2009 with the title "Two substrate parallel optical sub-assembly" and is incorporated herein by reference. In U.S. Pat. No. 7,517,159, Rolston et al. describe an optical assembly and a method for assembling components of the optical assembly, the method including providing a structure for guiding light; providing a plurality of optical fibers embedded in a fixed arrangement in the structure, the optical fibers for coupling the light from a coupling surface the structure; abutting a first package against the coupling surface, such that each one of multiple elements comprised in the first package is substantially aligned with each one of a first group of optical fibers in the plurality of optical fibers; and abutting a second package against the coupling surface, adjacent to the first package, and such that: the first and the second package are spaced apart by a gap; and each one of multiple elements comprised in the second package is substantially aligned with each one of a second group of optical fibers in the plurality of optical fibers, the gap providing a tolerance in a position of any one of: each one of the elements in the packages; the packages with respect to each other, and each one of the packages with respect to the structure.

U.S. Pat. No. 7,522,807 issued to Rolston et al. on Apr. 21, 2009 with the title "Optical connector assembly" and is incorporated herein by reference. In U.S. Pat. No. 7,522,807, Rolston et al. describe a coupling for at least one optical fiber with an optoelectronic device. The apparatus includes at least one v-groove for receiving at least one optical fiber. A first end of the apparatus is then polished at a predetermined angle in order to enable an optical coupling with the optoelectronic device.

U.S. Pat. No. 7,537,394 issued to Rolston et al. on May 26, 2009 with the title "Method for assembling a two substrate parallel optical sub-assembly" and is incorporated herein by reference. In U.S. Pat. No. 7,537,394, Rolston et al. describe an optical assembly and a method for assembling components of the optical assembly, the method including: providing a structure for guiding light; providing a plurality of optical fibers embedded in a fixed arrangement in the structure, the optical fibers for coupling the light from a coupling surface the structure; abutting a first package against the coupling surface, such that each one of multiple elements in the first package is substantially aligned with each one of a first group of optical fibers in the plurality of optical fibers; and abutting a second package against the coupling surface, adjacent to the first package, and such that: the first and the second package are spaced apart by a gap; and each one of multiple elements in the second package is substantially aligned with each one of a second group of optical fibers in the plurality of optical fibers, the gap providing a tolerance in a position of any one of: each one of the elements in the packages; the packages with respect to each other, and each one of the packages with respect to the structure.

There is a need for an improved coupler for launching light from a plurality of optical fibers into a photonic chip (as well as for launching light from a photonic chip into a plurality of optical fibers) for such uses as data transmission and communications, optical networking, photonics, optical computing, generation of laser seed light signals of different wavelengths, and combining laser signals.

BRIEF SUMMARY OF THE INVENTION

In some embodiments, the present invention provides an apparatus that includes a grooved first plate; a transparent second plate; and a plurality of optical fibers held between the first plate and the second plate, wherein each one of the plurality of optical fibers has a core and a first cladding layer that surrounds the core, wherein each respective one of the plurality of optical fibers has an end facet that reflects light from the core of the respective optical fiber through a first region of the first cladding layer and out of the respective optical fiber and through the transparent second plate, and wherein the first region has a higher index of refraction than a portion of the first cladding layer surrounding the first region. Other embodiments use only one optical fiber in such an apparatus and/or method.

Some embodiments of the apparatus further include a power supply that supplies electrical power to various controllers and/or optical pumps. Some embodiments of the apparatus further include a laser controller that controls various controllers and/or optical pumps that provide pump energy to optical power amplifiers in the system. Some embodiments of the apparatus further include a laser-signal controller that controls wavelengths and/or beam angles of master oscillators that generate optical seed signals. Some embodiments of the apparatus further include a target imaging and analysis subsystem that determines locations and threat levels of possible targets, and that sends signals to control the laser controller and the direction pointing of output optic system that points the output beam. In some embodiments, the apparatus includes an enclosure. In some embodiments, the apparatus includes a vehicle, naval vessel, or aircraft that transport the laser components of the apparatus.

In some embodiments, the present invention provides a method for making an apparatus that transmits light between corresponding ones of a plurality of optical waveguides in a photonic chip and ones of a plurality of optical fibers operatively coupled to the photonic chip. This method includes providing a grooved first plate; providing a transparent second plate; clamping a plurality of optical fibers between the first plate and the second plate, wherein each one of the plurality of optical fibers has a core and a first cladding layer that surrounds the core; polishing each respective one of the clamped plurality of optical fibers to have an end facet that reflects light from or to the core of the respective one of the clamped plurality of optical fibers through a first region of the first cladding layer and through the transparent second plate; and treating the first region of each one of the clamped plurality of optical fibers such that the first region has a higher index of refraction than a portion of the first cladding layer surrounding the first region. In some such embodiments, a plurality of regions (one for each of the plurality of fibers) of the transparent plate is also (or alternatively) treated to form waveguides in the transparent plate.

In some embodiments, the present invention provides an apparatus for making a device that transmits light between corresponding ones of a plurality of optical waveguides in a photonic chip and ones of a plurality of optical fibers operatively coupled to the photonic chip. This device includes a grooved first plate; a transparent second plate; and a plurality of optical fibers clamped between the first plate and the second plate, wherein each one of the plurality of optical fibers has a core and a first cladding layer that surrounds the core. The apparatus for making includes means for polishing each respective one of the clamped plurality of optical fibers to have an end facet that reflects light from or to the core of the respective one of the clamped plurality of optical fibers through a first region of the first cladding layer and through the transparent second plate; and means for treating the first region of each one of the clamped plurality of optical fibers such that the first region has a higher index of refraction than a portion of the first cladding layer surrounding the first region. In some embodiments, the device further includes the photonic chip.

In some embodiments, the present invention provides an apparatus that transmits light between corresponding ones of a plurality of optical waveguides in a photonic chip and ones of a plurality of optical fibers operatively coupled to the photonic chip. This apparatus includes a grooved first plate; a transparent second plate; and a plurality of optical fibers clamped between the first plate and the second plate, wherein each one of the plurality of optical fibers has a core and a first cladding layer that surrounds the core; means for reflecting light at ends of each clamped one of the plurality of optical fibers through a first region of the first cladding layer and through the transparent second plate; and means for keeping signal light in the first region and for preventing the signal light from entering the cladding outside the first region. Some embodiments further include the photonic chip. In some embodiments, the first region of each one of the clamped plurality of optical fibers is fused to the transparent second plate. In some embodiments, the first region of each one of the clamped plurality of optical fibers is bonded to the transparent second plate using glass solder or deposited glass material (such as glass deposited by vapor deposition, sputtering or other suitable method). In some embodiments, the transparent second plate is removed and/or omitted in the final device such that each one of the plurality of optical fibers is in direct contact with the photonics chip. In some embodiments, the optical fibers are bonded to the transparent plate (or directly to the photonics chip in embodiments that omit the transparent plate) using methods and materials such as described in U.S. Pat. No. 7,149,399 to Meder et al., which is incorporated herein by reference. In some embodiments, the means for reflecting reflects light at an obtuse angle (i.e., greater than 90 degrees) to a longitudinal axis of the core of that fiber. In some embodiments, the photonics chip includes a Bragg grating on each waveguide where the obtusely reflected light enters the waveguide in the chip. In some embodiments, the means for reflecting reflects light at a 90-degree angle to a longitudinal axis of the core of that fiber. In some other embodiments, the means for reflecting is an end facet on the fiber at an obtuse angle of at least about 120 degrees and no more than about 150 degrees to a longitudinal axis of the core of that fiber is used. In some embodiments, the light from the core is reflected at an obtuse angle (or for light traveling the opposite direction, this is the light reflected into the core). In some embodiments, each one of the plurality of optical fibers has a second cladding layer that has a lower index of refraction than the first cladding layer and that surrounds the first cladding layer, and the second cladding layer is removed from ends of the optical fibers before the plurality of optical fibers are clamped between the first plate and the second plate (since such second cladding layers are used to contain pump light, and it is desirable to remove the pump light before it reaches the low-profile fiber-coupling device to avoid excessive heat buildup due to absorbed pump light). Some embodiments further include the photonic chip, wherein the photonic chip has a plurality of light ports; means for aligning the photonic chip with the transparent second plate to align each one of the plurality of light ports to the first region of a corresponding one of the plurality of optical fibers; and means for affixing the photonic chip, the transparent second plate, the plurality of optical fibers, and the grooved first plate to one another. In some embodiments, the means for aligning includes fiducial marks on the device and/or the photonic chip (e.g., in some embodiments, the fiducial marks are metal lines on the transparent plate, or the like).

BRIEF DESCRIPTION OF THE FIGURES

FIG. 3 is a schematic side cross-sectional side view of a lapping-polishing operation 301 for making a low-profile fiber-coupling device 101 starting with a grooved fiber holder 300, according to some embodiments of the present invention.

FIG. 4A is a schematic side cross-sectional side view of a waveguide-forming operation 401 for making a low-profile fiber-coupling device 101 starting with a lapped-polished V-groove fiber holder 400, according to some embodiments of the present invention.

FIG. 4B is a side cross-sectional side view of a resulting low-profile fiber-coupling device 101 after the operations described for FIG. 3 and FIG. 4A, according to some embodiments of the present invention.

FIG. 4C is a side cross-sectional side view of a resulting low-profile fiber-coupling device 402 (which omits plate 120) after the operations described for FIG. 3 and FIG. 4A, according to some embodiments of the present invention.

FIG. 5A is a schematic side cross-sectional side view of an optical subsystem 501 having a low-profile fiber-coupling device 101 operatively coupled to a photonic chip 545, according to some embodiments of the present invention.

FIG. 5B is a schematic end cross-sectional side view of an optical subsystem 502 having a plurality of low-profile fiber-coupling devices 101 operatively coupled to wafer 540 having a plurality of photonic chips 545, according to some embodiments of the present invention.

FIG. 5C is a schematic side cross-sectional side view of an optical subsystem 503 having a low-profile fiber-coupling device 101 operatively coupled to a photonic chip 545, according to some embodiments of the present invention.

FIG. 5D is a schematic end cross-sectional side view of an optical subsystem 504 having a plurality of low-profile fiber-coupling devices 101 operatively coupled to wafer 540 having a plurality of photonic chips 545, according to some embodiments of the present invention.

DETAILED DESCRIPTION OF THE INVENTION

Figure 1A:
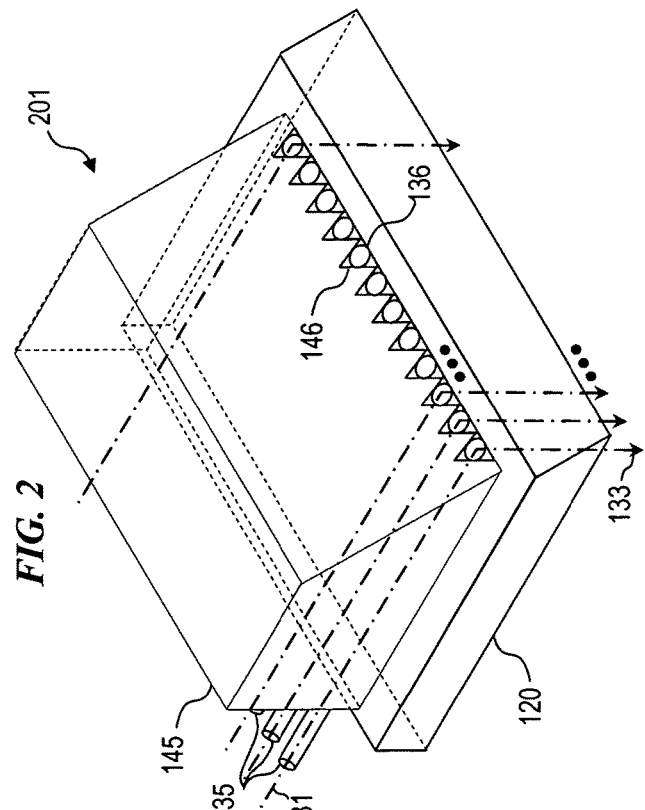
FIG. 1A is an isometric view of a low-profile fiber-coupling device 101 for coupling light to and/or from photonic chips, according to some embodiments of the present invention.

Although the following detailed description contains many specifics for the purpose of illustration, a person of ordinary skill in the art will appreciate that many variations and alterations to the following details are within the scope of the invention. Specific examples are used to illustrate particular embodiments; however, the invention described in the claims is not intended to be limited to only these examples, but rather includes the full scope of the attached claims. Accordingly, the following preferred embodiments of the invention are set forth without any loss of generality to, and without imposing limitations upon the claimed invention. Further, in the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally corresponds to the FIG. number in which that component is first introduced, such that the same reference number is used throughout to refer to an identical component which appears in multiple Figures. Signals and connections may be referred to by the same reference number or label, and the actual meaning will be clear from its use in the context of the description.

As used herein, an optical signal (the signal) is light of a signal wavelength being amplified, or of a laser output (and may or may not be modulated with information), and optical pump light is light of the wavelength used to input optical energy and power to an optical amplifier or laser. As used herein, "cladding light" refers to light propagating in the cladding of an optical fiber and can include either signal light or pump light or both.

In this document, relational terms such as first and second, top and bottom, and the like are used solely to distinguish one entity or action from another entity or action without requiring or implying any actual spatial relationship, importance, or temporal sequence between such entities or actions, unless specifically stated. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus. The terms "a" and "an" are defined as "one or more" unless explicitly stated otherwise. The terms "substantially", "approximately", "about" or the like, are defined as being close to as understood by one of ordinary skill in the art. The term "approximately" is defined to be within plus or minus 10% inclusive, unless specifically stated otherwise (such as "within plus or minus 5% inclusive," "within plus or minus 1% inclusive," "within plus or minus 0.5% inclusive," or "within plus or minus 0.1% inclusive"). The term "coupled" as used herein is defined as connected, although not necessarily directly coupled without intermediate elements and not necessarily mechanically coupled. A device or structure that is "configured" in a certain way is configured in at least that way, but may also be configured in ways that are not listed.

In some embodiments, the present invention provides an apparatus and method for connecting a plurality of optical fibers to one or more photonic devices. Traditional methods use geometrical lens optics, or shaped fibers, or butt-coupling of fiber to the chip surface. All of these methods are limited in their thermal stability and are not mechanically suitable for attaching fibers to the broad top surface of a photonic chip.

Some embodiments of the present invention permit for the first time high performance optical coupling of single mode fibers to the top surface of photonic chips with the fiber oriented parallel to the chip surface and without lenses or other discrete optical elements in the optical path. In some embodiments, only a reflective facet at the end of each fiber is "in" the optical path. Thus the thermal stability of the connection is improved while achieving the same performance as butt-coupling. In some embodiments, the present invention may enable an order of magnitude reduction in the packaging costs of photonic chips.

In some embodiments, an otherwise traditional V-groove array assembly of fiber ends is polished at a greater-than-135-degree angle to form a facet that acts as a mirror, reflecting the fiber mode of the signal in the core at an obtuse angle of greater than 90 degrees relative to the core axis. Some embodiments use 135 degrees for the end facet on each fiber. Some embodiments use angles other than 135 degrees for the end facet on each fiber. In some embodiments, a shallower angle of the facet (such as 130 degrees) is used in order reflect at an acute angle to enhance coupling into the photonics chip as compared to using a 135-degree facet which reflects the light at a right angle. In some embodiments, the photonics chip includes a grating on each waveguide where the light enters or exits, and the angle of the reflected beam is chosen to correlate to the grating period in order to enhance light coupling between the fiber and the photonics chip. In some such embodiments, a femtosecond laser (i.e., a laser that generates pulses shorter than a picosecond) is used to modify the cladding index of refraction locally at the facet to produce an optical waveguide located precisely at the mirror reflection point and oriented at an obtuse angle (or in other embodiments, at a right angle) to the axis of the core. In some embodiments, a waveguide is also formed in the transparent plate through which the signal light that has been (or will be, if the light is traveling toward the fiber) reflected. In some embodiments, an all glass optical path extends from the core of the fiber all the way through the transparent plate 120, and a waveguide is formed to provide a path for the signal light that guides and constrains the light within the waveguide. In some embodiments, the present invention uses an index-modification operation such as those described in U.S. Pat. No. 6,768,850 titled "Method of index trimming a waveguide and apparatus formed of the same," which is incorporated herein by reference. Thus the reflected optical signal beam 132 is confined by the in-situ written waveguide up to the edge of the fiber-cladding surface. The cladding surface is then placed in contact with, or close proximity to, the surface of the photonic chip to couple light between the chip and the fibers.

Some embodiments use the femtosecond laser system to locally alter the cladding of the polished fiber to create an in-situ written waveguide which guides the reflected light from the fiber core into or from the photonic chip. This method uses no geometrical optics to focus the light, and thus is lower in cost and improved in optical loss and thermal stability.

There are a variety of conventional methods to couple light from fibers to photonic chip devices. They all use either geometrical lensing, or direct butt-coupling of the fiber to the chip. Butt coupling is simple; however, it is not suitable for use on the broad top surface of the photonic chip. End-fire coupling is less stable due to the mechanical interaction of the package structure that holds the fiber in place. The method of the present invention eliminates the package otherwise needed for providing the mechanical system to mount and hold the fiber. Since the fiber is directly bonded to the broad top surface of the chip, improved mechanical and optical stability is achieved to the point where the binding is capable of surviving solder reflow temperature exposure, which is not currently possible with single-mode fiber coupling.

The present invention is related to an approach by Reflex Photonics LLC (in some embodiments, such as described in U.S. Pat. Nos. 7,517,159, 7,522,807 and/or 7,537,394, each of which is incorporated herein by reference) that performs angle polishing of fiber tips and reflects the light into and out of the fiber. However that approach uses only multi-mode fiber and does not perform acceptably with single-mode fiber. In addition, the Reflex patents can not use a plate (such as transparent plate 120) since the light would continue to spread while passing through a lid). In contrast, the inclusion of the in-situ written waveguide into the side of the fiber and/or through the transparent plate 120 are novel features of the present invention that make the technology of the present invention work with single-mode fiber for highly efficient coupling of light into the photonic chip.

The present invention permits the elimination of geometrical optics or other mechanical structures in bonding a fiber to a photonic chip improves the thermal stability and enables the mechanical axis of the fiber to be low in profile along the broad top surface of the chip. This makes the fiber/chip system small in size and amenable for low-cost automated assembly using pick and place tooling and solder reflow processes.

U.S. Pat. No. 6,768,850 titled "Method of index trimming a waveguide and apparatus formed of the same" describes one process that is used, in some embodiments, for forming the in-situ waveguide, and is incorporated herein by reference.

In some embodiments, the present invention is useful in systems for data transmission and communications, optical networking, photonics and optical computing. See, for example, FIG. 6C described below.

FIG. 1A is schematic isometric view (not necessarily to scale for all embodiments of the invention) of a low-profile fiber-coupling device 101 for coupling light in optical fibers 130 to and/or from photonic chips (not shown here-see FIG. 5A and FIG. 5B), according to some embodiments of the present invention. In some embodiments, fiber-coupling device 101 includes a plurality of optical fibers 130 each having a core 139 that carries one of a plurality of light signals 131. In some embodiments, each fiber's core is surrounded by a first cladding layer 138 having a lower index of refraction than the core 139. In some embodiments, first cladding layer 138 is used to carry optical pump light and inject it into core 139 over a length of core 139. In some embodiments, cladding 138 is surrounded by one or more additional claddings, such as a second cladding layer. In some embodiments, the second cladding layer is, includes, or is surrounded by, a polymer coating or jacket. In some embodiments, the plurality of optical fibers 130 is clamped between grooved plate 140 and transparent plate 120. In some embodiments, transparent plate 120 is transparent to light of the signal wavelength but need not necessarily by transparent to other wavelengths (for example, some embodiments use a single-crystal silicon wafer that is transparent to many infrared wavelengths but is opaque to visible light). In some embodiments, grooved plate 140 a plurality of grooves 142. In some such embodiments, each groove 142 is a V-shaped groove. In other embodiments, other groove shapes may be used. In some embodiments, each fiber signal 131 is reflected by an angled facet 132. In some such embodiments, each angled facet 132 is at a 135-degree angle in order to reflect the signal light 131 at a right angle (90-degree angle) so that the signal is guided through transparent plate 120 in a confined waveguide at a perpendicular direction and emerges from plate 120 at a right angle to the bottom face of plate 120 as reflected signal 133 (or for waveguides that emit light from the photonics chip into the fibers, that light enters into plate 120). In other embodiments, other facet angles may be used (e.g., in some embodiments, the facet angle 311 (see FIG. 3) is chosen such that the reflected signal 133 emerges from the bottom face of plate 130 at Brewster's angle in order to efficiently transmit polarized signal light). In some embodiments, the facet face is coated with a material (such as a multi-layer dielectric such as described in U.S. Pat. No. 6,754,006 titled "Hybrid metallic-dielectric grating," U.S. Pat. No. 5,907,436 titled "Multilayer dielectric diffraction gratings," or U.S. Pat. No. 6,813,405 "Compact apparatus and method for integrated photonic devices having folded directional couplers," each of which is incorporated herein by reference). In some embodiments, the exit point (at the bottom in FIG. 1A and FIG. 1B) of each fiber is fused to transparent plate 120 in order to eliminate any interface that could reflect signal light from the core. In some embodiments, the rest of the fiber under the facet is not fused to plate 120, in order that any pump light in the cladding 138 is reflected back into the cladding, thus reducing heat buildup and unwanted light wavelengths from entering or passing through plate 120. In some embodiments, the first waveguide region of each one of the clamped plurality of optical fibers is bonded to the transparent second plate using glass solder or deposited glass material (such as glass deposited by vapor deposition, sputtering or other suitable method). In some embodiments, the transparent second plate is removed and/or omitted in the final device such that each one of the plurality of optical fibers is in direct contact and/or bonded, welded, fused, or otherwise connected directly (i.e., meaning without an air gap or other interface having a change in index of refraction) with the photonics chip.

In some embodiments, transparent plate 120 is made of or includes glass (for example, in some embodiments, fused silica (a type of glass) is used for transparent plate 120), and optical fibers 130 are made of glass, where the glass of the transparent plate 120 is selected to be able to fuse with the glass of the optical fibers 130 in order that when fused, an all-glass optical path is formed between the core 139 of each fiber 130, wherein the optical path extends through the transparent plate 120 to the input/output face that faces the photonic chip 545 (see FIG. 5). In some embodiments, grooved plate 140 is made of silicon, glass, metal or other suitable material or combination of materials. In some embodiments, the grooves 142 of grooved plate 140 are formed by lithographic etching, cutting with a dicing saw, scribing, molding, plating and peeling a metal layer such as nickel from a master form, or other suitable process.

Figure 1B:
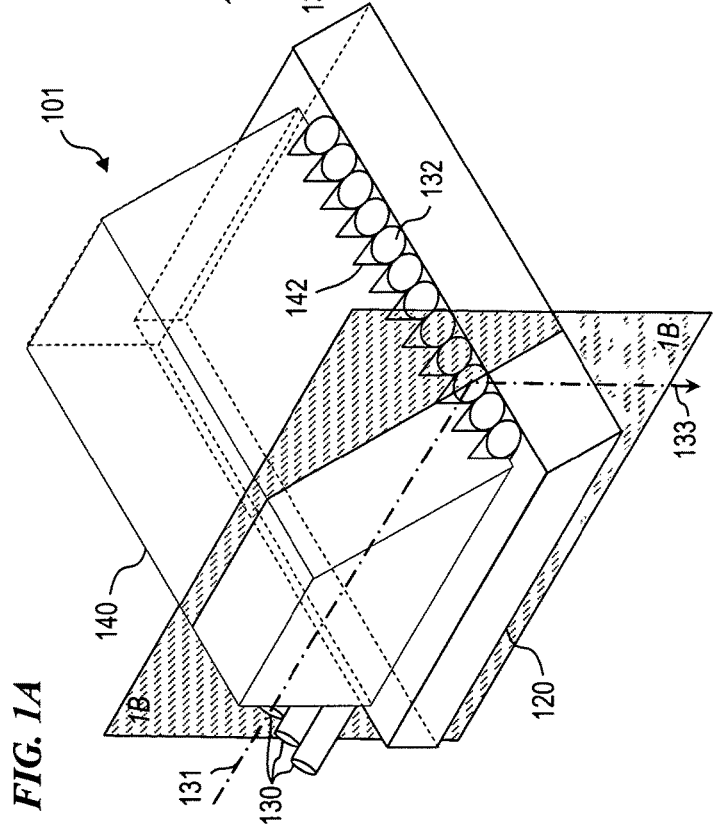
FIG. 1B is a side cross-sectional side view of low-profile fiber-coupling device 101 as viewed along cut plane 1B of FIG. 1A and cut line 1B of FIG. 1C, according to some embodiments of the present invention.

FIG. 1B is a cross-sectional view of low-profile fiber-coupling device 101 as viewed along plane 1B of FIG. 1A. As shown in FIG. 1B, in some embodiments, optical fiber 130 does not include second cladding layer at the location of viewing plane 1B. In some embodiments, grooved plate 140 also acts as a cover plate that in some embodiments, made of metal, silicon, sapphire, ceramic and/or other suitable material or composite of materials, and is affixed using bolts, spring clips or other suitable fasteners 551 (see FIG. 5A) connected to or around mounting features of transparent plate 120 and/or photonic chip 545 (see FIG. 5A) or into a mounting plate 550 on an opposite face of photonic chip 545. In some embodiments, mounting cover plates 550 are provided on the outside face of grooved plate 140 and the outside face of photonic chip 545. In some embodiments, the mounting plates 550 include heat sinks (e.g., in some embodiments, having fins, fluid channels, heat pipes and/or the like to carry the heat away from device 101. In some embodiments, an external housing is used to complete the opaque enclosure 120, thus enclosing transparent enclosure 115 within a light-tight or substantially light-tight volume.

Figure 1C:
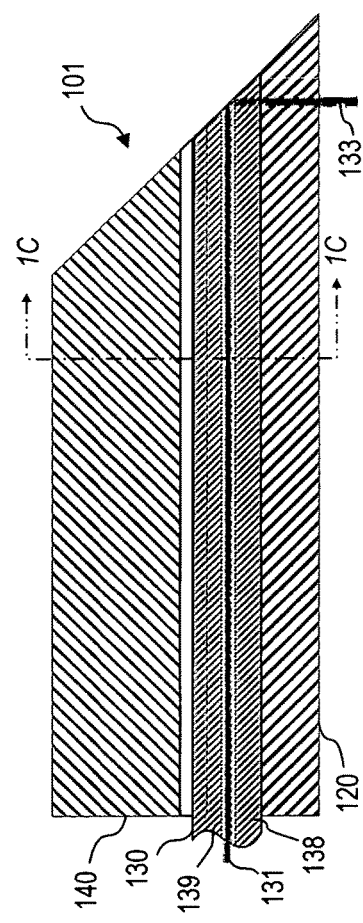
FIG. 1C is an end cross-sectional view of low-profile fiber-coupling device 101.

FIG. 1C is an end cross-sectional view of low-profile fiber-coupling device 101 as seen at cut line 1C of FIG. 1B.

Cut line 1B of FIG. 1C represents where the cross section location of FIG. B. In some embodiments, grooves 142 are shallow and spaced such that fibers 130 are very close or touching one another, in order to achieve high-density devices. In other embodiments, the grooves are deeper and/or spaced further apart in order to separate the fibers. In some such embodiments, such as shown in FIG. 2, the grooves are made deep enough that the grooves shield each fiber from its adjacent neighbors, which helps prevent stray light from one fiber entering another fiber.

Figure 2:
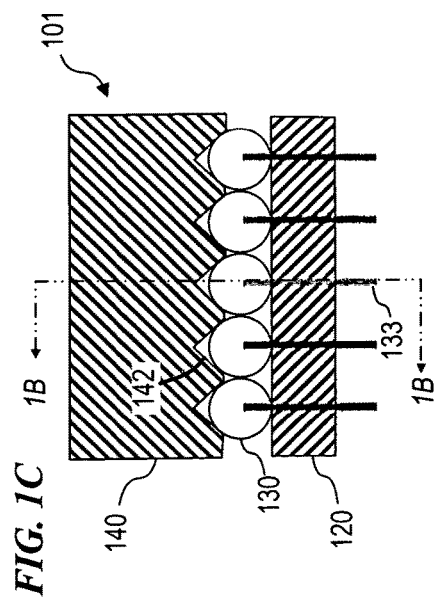
FIG. 2 is an isometric view of a low-profile fiber-coupling device 201 for coupling light to and/or from photonic chips, according to some embodiments of the present invention.

FIG. 2 is an isometric view of a low-profile fiber-coupling device 201 for coupling light to and/or from photonic chips, wherein the outer diameter of fibers 135 is smaller relative to the depth of the grooves 146 (in some embodiments, the grooves are deep enough to completely shield (i.e., 100% of light from any one fiber is blocked from entering other fibers) or substantially shield (i.e., at least 90% of light from any one fiber is blocked from entering other fibers)), the fibers 135 from one another, according to some embodiments of the present invention. As was the case shown in FIG. 1A, a plurality of different signals 133 is extracted from the plurality of fibers 135 (e.g., in some embodiments, one signal is extracted from each fiber, while in other embodiments, a plurality of signals is extracted from one or more of the fibers 135) and transmitted through plate 120.

Still referring to FIG. 2 and again to FIG. 1A, FIG. 1B, and FIG. 1C, in some embodiments (such as described U.S. Provisional Patent Application 61/854,277 filed Apr. 30, 2014 by Yongdan Hu et al. titled "SYSTEM AND METHOD FOR HIGH-POWER, HIGH-STRAYLIGHT-LOAD FIBER ARRAY", which is incorporated herein by reference), the grooved plate is coated with a high-reflectivity material (such as a metal or multi-layer dielectric) and/or the fiber ends within device 101 are coated with a lower-index-of-refraction material or multi-layer dielectric, that reflects straylight and prevents heat buildup in device 101.

Still referring to FIG. 2 and again to FIG. 1A, FIG. 1B, and FIG. 1C, in some embodiments (such as described in U.S. Pat. No. 8,355,608 to Yongdan Hu titled "METHOD AND APPARATUS FOR IN-LINE FIBER-CLADDING-LIGHT DISSIPATION," which is incorporated herein by reference), a portion of optical fiber 130 includes a light-scattering surface (in some embodiments, a rough surface formed on cladding layer 138) that is configured to scatter light (i.e., cladding light; usually excess pump light) located in the first cladding layer 138 away from the tips of optical fiber 130 or 135 that are clamped in device 101. In some embodiments, the light-scattering portion of the fiber (the length of the fiber having light-scattering surface, also called a pump dump) is enclosed in a fiber-enclosure assembly, wherein the fiber-enclosure assembly is substantially enclosed in and affixed to a housing (e.g., such as housing 608 of FIG. 6A). One wet etching technique usable with the present invention is described in U.S. Pat. No. 6,905,627 (hereinafter, "Wei et al."), titled "ETCHING METHOD FOR FABRICATING HIGH QUALITY OPTICAL FIBER PROBE", issued Jun. 14, 2005, and incorporated herein by reference. Wei et al. describe techniques for chemically etching a fiber tip to form a smooth fiber probe.

In some embodiments, the grooved plate (140 or 145) is silicon. In some embodiments, the grooved plate is made from a material that includes silicon. In some embodiments, the grooved plate is metal. In some embodiments, the grooved plate is made from a material that includes a metal. In some embodiments, the grooved plate is made from a material that includes aluminum. In some embodiments, the grooved plate is made from a material that includes copper. In some embodiments, the grooved plate is made from a material that includes silver. In some embodiments, the grooved plate is made from a composite or layered structure that includes a plurality of materials.

FIG. 3 is a schematic side cross-sectional side view of a lapping-polishing operation 301 for making a low-profile fiber-coupling device 101 starting with a grooved fiber holder 300, according to some embodiments of the present invention. In some embodiments, grooved fiber holder 300 includes a transparent second plate 124, a grooved first plate 143 and a plurality of optical fibers 137, clamped to one another before the lapping-polishing operation forms the angled facets on the ends of the optical fibers. The lapping-polishing device 380 is used to polish the assembled transparent second plate 124, grooved first plate 143 and plurality of optical fibers 137 to a highly polished and angled face 310 (e.g., in some embodiments, at a 135-degree angle 311 to the axis of each core 139), resulting in a lapped-polished grooved fiber holder 400 as shown in FIG. 4A. In some embodiments, the angle 311 is smaller than 135 degrees such that the light from the core of the fiber is reflected at an acute angle. In some embodiments, the present invention uses a method of forming the reflecting surface, wherein for surfaces of 'shallow' angles (e.g., less than 135 degrees), the phenomenon of total internal reflection provides for a highly reflecting surface to act as the mirror. Other embodiments use a metal, multi-layer dielectric, hybrid metal-dielectric or other high-reflectance coating on the polished face to ensure a reflection when the total internal reflection cannot be assured. Total internal reflection requires a low index-of-refraction material, such as air to occupy the region at the polished surface. In some embodiments, if air cannot be provided, a high-reflectance coating on the polished mirror is used.

In some embodiments, the polishing operation of FIG. 3 forms an angled facet on the plates as well, forming transparent plate 120 with the angled left face 124 (which is useful in some embodiments, to align the light exit ports on the bottom face of transparent plate 120 to the photonics chip shown in FIG. 5A) from the starting transparent plate 123, and forming grooved plate 140 with the angled left face 144 (which is useful in some embodiments, to provide access for the focussed pulsed laser beam 499 to heat through the end facet 132 of fiber 130) from the starting grooved plate 143. In some embodiments, the present invention uses methods and/or materials such as described in U.S. Pat. No. 7,517,159 titled "Two substrate parallel optical sub-assembly," U.S. Pat. No. 7,522,807 titled "Optical connector assembly" and/or U.S. Pat. No. 7,537,394 titled "Method for assembling a two substrate parallel optical sub-assembly," each of which is incorporated herein by reference.

In some embodiments, transparent plate 123 is glass. In other embodiments, transparent plate 123 includes glass. In other embodiments, transparent plate 123 is or includes silicon, sapphire, quartz, or other suitable material or combination of materials that is substantially transparent to light of the signal wavelength.

FIG. 4A is a schematic side cross-sectional side view of a waveguide-forming operation 401 for making a low-profile fiber-coupling device 101 starting with a lapped-polished grooved fiber holder 400, according to some embodiments of the present invention. In some embodiments, a series of high-power laser pulses 498 are focussed by optics 440 (e.g., in some embodiments, a microscope objective) to form focussed pulses 499, which, in some embodiments, heat a series of adjacent and/or overlapping largely spherical volumes to form a columnar waveguide region (in some embodiments, many separate point-like exposures in 3 dimensions are used to achieve a cylindrical waveguide) of transparent plate 120 and the region of cladding 138 between the core 139 at the facet and the exit/entry location (which, for waveguides oriented perpendicular to the bottom face, is located directly below that point, or for waveguides oriented at an angle to the perpendicular vector of the bottom face, is located at a horizontal offset to the reflection point on the end facet, as shown in FIG. 4A), thereby forming a region having a higher index of refraction and thus a highly efficient light signal path out the bottom of the fiber and through transparent plate 120. In some embodiments, this light signal path is a waveguide structure that has a higher index of refraction than the surrounding material (i.e., the part of transparent plate 120 surrounding the waveguide has a lower index of refraction (often referred to as "n") than the n of the waveguide. In some embodiments, it may even be possible to form a hollow waveguide (which inherently has a lower index of refraction) using the pulse-laser-pulse procedure. In some non-135-degree-facet embodiments, the waveguide path through the transparent plate 120 will not be at a 90-degree angle to the bottom face of plate 120, but will follow the direction of light as it is reflected from the facet 132 (in some embodiments, for example, at an obtuse angle). The direct-write laser method illustrated by FIG. 4A will define a non-90-degree path from the reflecting facet 132 to the photonic chip surface, and will thus the light will enter or exit photonic chip 545 at a non-perpendicular angle chosen to optimize the efficiency of a grating on the photonic chip surface used to transfer light through that surface.

In some embodiments, the present invention uses an index-modification operation such as described in U.S. Pat. No. 6,768,850 (which has the title "Method of index trimming waveguide and apparatus formed of the same," and which is incorporated herein by reference). The result of the operation described for FIG. 4A is a finished low-profile fiber-coupling device 101 as was described above for FIG. 1A, FIG. 1B and FIG. 1C. In some such embodiments, the high-power pulsed laser light also fuses the bottom of each of the plurality of fibers 130 to transparent plate 120, thus forming an uninterrupted all-glass light propagation path from the core 139 of fiber 130 through the transparent plate 124. In some embodiments, the workpiece 400 and the waveguide-forming laser and optics 440 are moved along a path 442 that is tilted relative to the plane of the bottom face, in order to form a waveguide that is at an obtuse angle (i.e., an angle larger than 90 degrees) in order that the signal light intersecting the photonics chip 545 is not at a 90-degree right angle, which allows transmission into a waveguide to be more efficient especially when using gratings or certain other taps on the waveguide to get the light into or out of the waveguide surface. In some embodiments, each waveguide includes a port having a wavelength-selective evanescent coupler and/or a wavelength-selective optical diffraction grating perform a selection of one or more wavelengths to exit from or enter into the port, such as described in United States Patent Publication 20030185514 by Bendett and Whaley titled "Method and apparatus for tapping a waveguide on a substrate," which is incorporated herein by reference.

In some embodiments, each of the fibers 130 is affixed to grooved plate 140 (e.g., using glass solder, epoxy, fusing, laser welding or other suitable materials and/or methods). In some such embodiments, the bottom plate 120 is omitted such that when done the optical fibers directly couple to the photonics chip 545 (see FIG. 5C) or other device.

FIG. 4B is a side cross-sectional side view of a resulting low-profile fiber-coupling device 101 after the operations described for FIG. 3 and FIG. 4A, according to some embodiments of the present invention.

FIG. 4C is a side cross-sectional side view of a resulting low-profile fiber-coupling device 402 (which omits plate 120) after the operations described for FIG. 3 and FIG. 4A, according to some embodiments of the present invention. In some embodiments, low-profile fiber-coupling device 402 is substantially the same as device 101 of FIG. 4B, but does not include plate 120. In some embodiments, a sacrificial substitute for plate 120 is used for the methods of polishing (as in FIG. 3) and/or waveguide forming (as in FIG. 4A), but is then removed so that the fibers 130 can be directly coupled to the intended device (such as device 545 of FIG. 5A or device 650 of FIG. 6C). In other embodiments, the fabrication described for of polishing (as in FIG. 3) and/or waveguide forming (as in FIG. 4A) is done without any such plate 120.

Note that in some embodiments, transparent plate 120 is highly transparent to light having the wavelength(s) of the signal light, but need not necessarily be transparent to light of other wavelengths (for example, silicon is highly transparent to infrared light having wavelengths of 1200 nm or longer, but a silicon wafer is substantially opaque to visible light). In some embodiments, for example those using silicon substrates, the waveguides through the substrate are formed by lithographically defined (or ion-implanted) doping channels, wherein the doped channels have a higher index than the surrounding silicon and thus guide the infrared signals. In some embodiments, transparent plate 120 is a glass that will fuse with a glass optical fiber.

FIG. 5A is a schematic side cross-sectional side view of an optical subsystem 501 having a low-profile fiber-coupling device 101 operatively coupled to a photonic chip 545, according to some embodiments of the present invention. In some embodiments, low-profile fiber-coupling device 101 is aligned with and affixed to photonic chip 545, such that a corresponding light-input port and/or light-output port 546 for each relevant one of the plurality of waveguides 541-542 is aligned to a corresponding faceted end of a fiber 130. If the port 546 is an output for photonics chip 545, then light travels out of waveguide 541, with beam 133 going upward (in this drawing) and into its corresponding fiber 130 traveling leftward as output beam 131. On the other hand, if the port 546 is an input for photonics chip 545, then light travels out of its corresponding fiber 130 traveling rightward as input beam 131, then reflecting downward (in this drawing) as beam 133 and into waveguide 541.

FIG. 5B is a schematic end cross-sectional side view of an optical subsystem 502 having a plurality of low-profile fiber-coupling devices 101 operatively coupled to wafer having a plurality of photonic chips 545, according to some embodiments of the present invention. In some embodiments, a wafer 540 having a plurality of photonic chips 545 is fabricated, with waveguides 541 formed simultaneously on all of the plurality of photonic chips 545. In some embodiments, the plurality of low-profile fiber-coupling devices 101 are then aligned and affixed, each to its corresponding photonic chip 545, and then the photonic chips 545 are diced apart from one another. In some embodiments, the low-profile fiber-coupling devices 101 are fused to the photonic chips 545 using heat and/or ultrasound. In some embodiments, a top and bottom mounting plates 550 are used to clamp each device 501 (see FIG. 5A) using springs and/or bolts 551. In some embodiments, one or more of the mounting plates 550 includes a heat sink to remove heat from the operating devices 501.

In some embodiments, the operating devices 501 are used in telecommunications systems to process optical signals (e.g., add/drop, filtering, amplifying and the like). In some embodiments, the telecommunications systems include power supplies, electronic/optical controllers, enclosures and the like.

FIG. 5C is a schematic side cross-sectional side view of an optical subsystem 503 having a low-profile fiber-coupling device 402 operatively coupled to a photonic chip 545, according to some embodiments of the present invention. In some embodiments, low-profile fiber-coupling device 402 is similar to low-profile fiber-coupling device 101 of FIG. 1A, except that plate 120 is omitted. In some embodiments, low-profile fiber-coupling device 402 is manufactured starting out with a bottom plate 120, but plate 120 is then removed so that the fibers 130 are laid directly on photonics chip 545. Thus, in some embodiments, optical subsystem 503 is similar to optical subsystem 501 of FIG. 5A, except that the bottom plate 120 of FIG. 5A is omitted, and the reflected input signal beams 133 from the fibers 130 exit through the side of fibers 130 directly entering photonic chip 545. Likewise, the output signal beams 133 from photonic chip 545 directly enter the fibers 130 through the side of fibers 130 and are then reflected at end facet 132. Other aspects and reference numbers are as described above for FIG. 5A.

FIG. 5D is a schematic end cross-sectional side view of an optical subsystem 504 having a plurality of low-profile fiber-coupling devices 101 operatively coupled to wafer 540 having a plurality of photonic chips 545, according to some embodiments of the present invention.

Figure 6A:
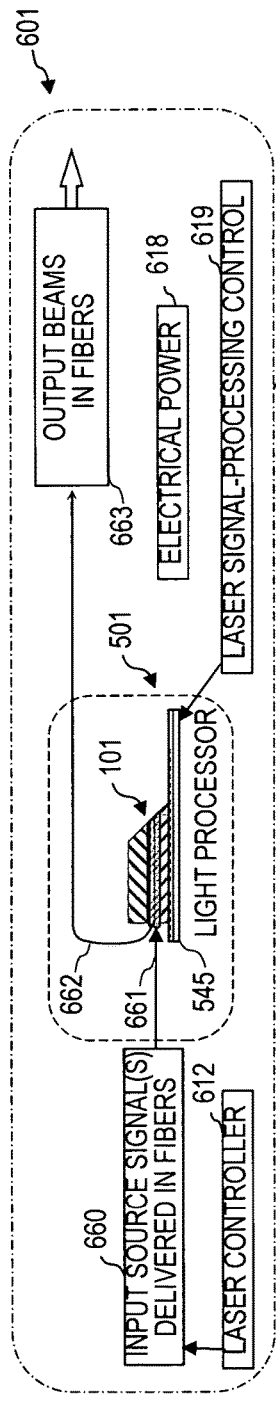
FIG. 6A is a schematic diagram of an optical processing system 601, according to some embodiments of the present invention.

FIG. 6A is a block diagram of an optical-processing system 601, according to some embodiments of the present invention. In some embodiments, system 601 is a telecommunications system, suitable for dense wavelength-division multiplexed optical signals that include a plurality of different wavelengths. In some embodiments, system 601 includes a controller 612 that controls or provides feedback to the source(s) 660 of the laser signal(s) 661 that are delivered in optical fibers to low-profile fiber-coupling device 101 of the present invention. Device 101 delivers the input light signals to photonics chip 545, which performs one or more operations (e.g., add/drop, filtering, amplifying and the like) on the input signals 661, and then outputs the output signal(s) 662 into other optical fiber(s) connected to device 101. Together, low-profile fiber-coupling device 101 and photonics chip 545 form light processor 501. In some embodiments, a laser-signal-processing controller 619 is used to control operation of light processor 501, and in some such embodiments, controller 619 receives data signals from light processor 501 and/or provides data signals to light processor 501 (in some such embodiments, the data signals are provided into, and/or obtained from, light processor 501 as electronic signals, while in other embodiments, the data signals are provided into, and/or obtained from, light processor 501 as optical, magnetic and/or other types of signals). In some embodiments, a power supply 618 supplies electrical power to various controllers and/or optical pumps in system 601. In some embodiments, system 601 is contained in an enclosure 608.

Figure 6B:
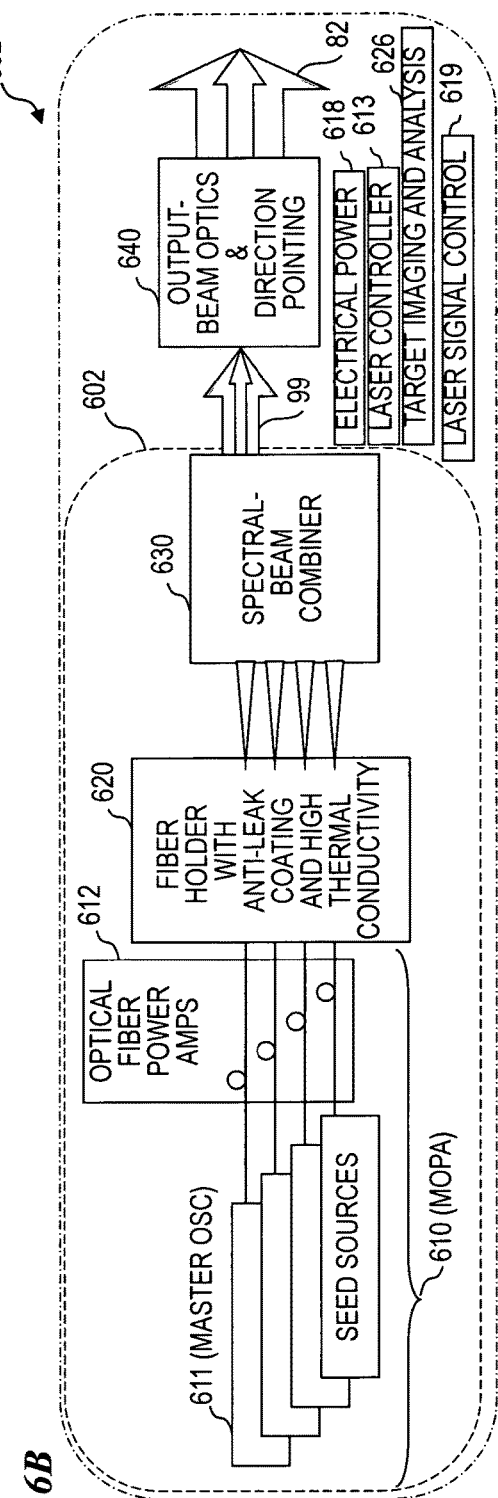
FIG. 6B is a schematic diagram of a high-power spectral-beam combining laser system 602, according to some embodiments of the present invention.
Figure 7:
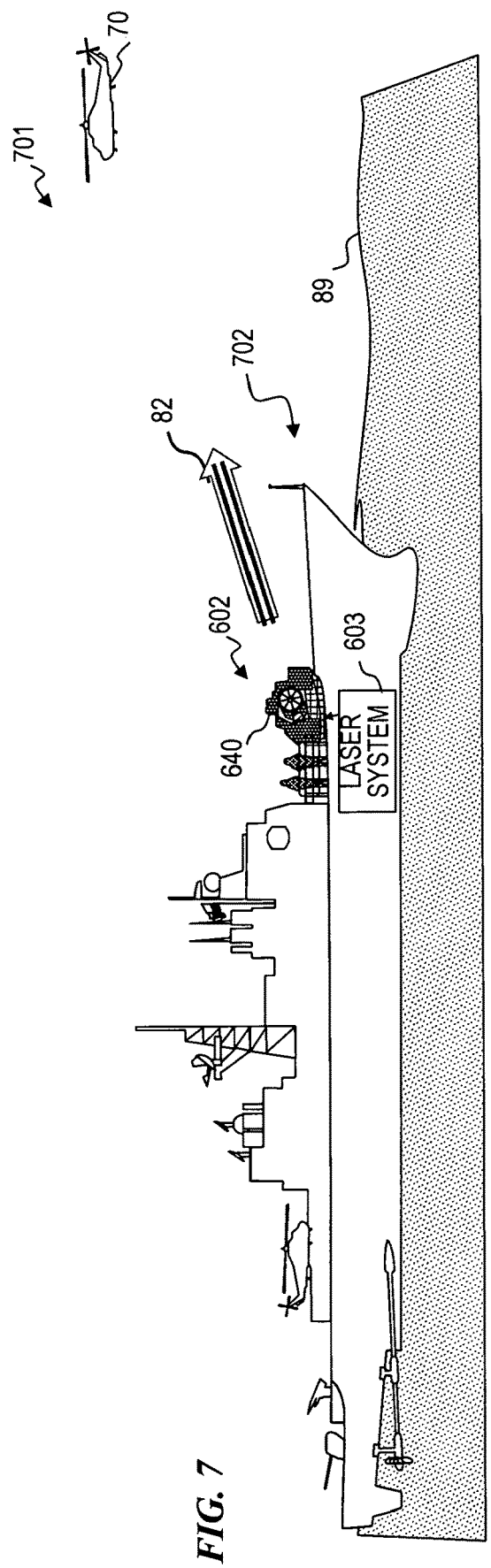
FIG. 7 is a diagram of a system 701 having a high-power-fiber-laser system 603 integrated into a naval vessel 702, and using one or more of the low-profile fiber-coupling devices as described herein, according to some embodiments.

FIG. 6B is a block diagram of a high-power spectral-beam-combining (SBC)-fiber-laser control system in an overall product 602 (e.g., a vehicle such as a naval vessel (e.g., such as shown in FIG. 7, for example a frigate, destroyer or aircraft carrier), a land vehicle (such as a tank or remotely-operated robotic vehicle), airframe (such as a helicopter or jet airplane), or facility (such as an airport or bunker)) using one or more of the low-profile fiber-coupling devices 101 and fiber-laser spectral-beam-combining (SBC) systems 630 as described in U.S. Pat. No. 8,179,594 by Tidwell, et al. titled "Method and apparatus for spectral-beam combining of fanned-in laser beams with chromatic-dispersion compensation using a plurality of diffractive gratings," U.S. Pat. No. 7,199,924 by Brown et al. titled "APPARATUS AND METHOD FOR SPECTRAL-BEAM COMBINING OF HIGH-POWER FIBER LASERS," and U.S. patent application Ser. No. 13/987,265 by Eric C. Honea et al. titled "APPARATUS AND METHOD FOR FIBER-LASER OUTPUT-BEAM SHAPING FOR SPECTRAL BEAM COMBINATION," which are each incorporated herein by reference. In some embodiments, system 602 includes a power supply 618 that supplies electrical power to various controllers and/or optical pumps in system 602. In some embodiments, system 602 includes a laser controller 613 that controls various controllers and/or optical pumps that provide pump energy to optical power amplifiers 612 in system 602. In some embodiments, system 602 includes a laser-signal controller 612 that controls wavelengths and/or beam angles of the master oscillators 611. In some embodiments, system 602 includes a target imaging and analysis subsystem that determines locations and threat levels of possible targets, and that sends signals to control the laser controller 613 and the direction pointing of output optic system 640 that points the output beam 82. In some embodiments, system 602 is held in an enclosure 609. In some embodiments, fiber holder 620 includes one or more low-profile fiber-coupling devices 101.

Figure 6C:
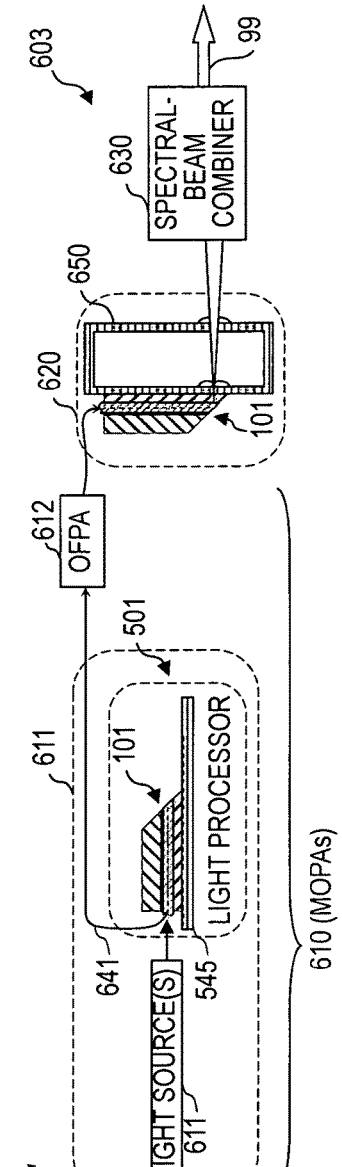
FIG. 6C is a schematic diagram of a high-power directed-energy weapon system 603, according to some embodiments of the present invention.

FIG. 6C is a schematic diagram of a high-power spectral-beam combining laser system 603, according to some embodiments of the present invention. In some embodiments, a light processor 501 uses a low-profile fiber-coupling device 101 such as described above and shown in FIG. 1A, attached to a photonics chip 545. In some embodiments, a plurality of seed lasers 611 operate as master optical oscillators and share a low-profile fiber-coupling device 101, wherein each master optical oscillator generates a laser signal (each signal having a different wavelength for a system 603 that uses an SBC 630 to combine the amplified signals into a single beam) that is amplified by a corresponding one of a plurality of optical power amplifiers 612. Together, each master oscillator 611 and its corresponding power amplifier are referred to as a master oscillator-power amplifier (MOPA) laser. In some embodiments, in addition to or in place of the external seed lasers 611, the photonics chip 545 itself generates its own laser seed signals, each having one or more of a plurality of different wavelengths that optically amplified by optical fiber power amplifiers 612, and then are combined by SBC 630, while in other embodiments, the external seed sources 611 are coupled into photonics chip 545 by fiber holder 101, and the signals are optically processed (e.g., analyzed and/or modified) in photonics chip 545 and then the output signals 641 are amplified to high power (e.g., in some embodiments, at least 1000 watts continuous-wave (CW) per signal) by optical-fiber power amplifiers 612, whose fiber outputs are clamped by fiber holder 101 of a fiber holder 620 that has an anti-leak coating and high thermal conductivity, and then output into SBC 630, which combines all the beams into a single combined beam 99. In some embodiments, the SBC 630 also includes beam-shaping optics that shape the combined beam 99 so that most of its power is transmitted through output optics 640.

FIG. 7 is a diagram of a system 701 having a high-power-fiber-laser system 603 integrated into a naval vessel 702, and using one or more of the low-profile fiber-coupling devices 101 as described herein, according to some embodiments. In some embodiments, system 603 includes the vehicle, airframe, vessel or facility enclosure 1109 and its other contents (e.g., engines and control systems), one or more battery and/or electrical power supplies 1118, a laser controller 1112 that provides the control of wavelength, pulse timing and duration for embodiments using pulse signals (other embodiments use CW (continuous wave) signal beams), output-power control, direction control of the output beam and the like, an imaging calculation microprocessor and/or circuitry 1126 that obtains an image signal from imager and calculates such data as target location and velocity that is then delivered to laser controller 1112, signal processors 1120 that receive wavelength-determination signals and/or directional-drift signals from the SBC (spectral-beam combiner) module 630 (with its associated wavelength-, beam-off-axis and beam-off-angle detection sensors and circuitry, as described in U.S. Pat. No. 7,199,924 issued Apr. 3, 2007 to Brown et al., titled "Apparatus and method for spectral-beam combining of high-power fiber lasers," which is incorporated herein by reference), and that delivers wavelength-correction control data to laser controller 1112. In some embodiments, laser controller 1112 generates the control and power signals that are based at least in part on forward-tap signals and backward-tap signals (e.g., in some embodiments, as described in U.S. Patent Publication No. US 2011/0091155 of Yilmaz et al., titled "In-Line Forward/Backward Fiber-Optic Signal Analyzer," which is incorporated herein by reference). In some embodiments, laser controller 1112 generates the control and power signals that are sent to fiber-laser module 610, which then delivers high-power optical beams at a plurality of different wavelengths to fiber holder optics 620 (e.g., in some embodiments, including fiber holder 101 of FIG. 1A) and SBC 630, which then combines the laser beams into a single multi-wavelength annular output laser SBC beam 99 that goes through Cassegrain optics 640, which collimates and directs the output beam 82 toward target 70 (e.g., a hostile aircraft or spacecraft—see FIG. 7), according to the control information that was generated based on image information obtained from imager 1126. In some embodiments, system 601 is part of, and used as an element of, a directed-energy (DE) weapon carried by a vehicle 1109 (such as a tank, an aircraft, or a naval vessel 702 on water 89 such as illustrated in FIG. 7).

Accordingly, some embodiments of the present invention further include a vehicle 702; an electrical power supply 1118 mounted to vehicle 702; a laser controller 1112 mounted to vehicle 702 and operatively coupled to receive electrical power from electrical power supply 1118 and operably coupled to power and control the plurality of laser sources 610; a Cassegrain projector 640 mounted to vehicle 702 and operatively coupled to receive the first annular spectrally combined beam 99 and configured to form a collimated second annular output beam 82 from the optical energy of the first annular spectrally combined beam 99; and a beam-direction controller operably coupled to Cassegrain projector 640 and operable to direct annular output beam 82 in one of a plurality of different possible directions relative to vehicle 702.

FIG. 7 is a diagram of a high-power-fiber-laser system 701 that includes a high-power-fiber-laser system 603 integrated into a naval vessel 702. In some such embodiments, high-power-fiber-laser system 603 includes one or more of the fiber holders 101 as described herein. In some embodiments, high-power-fiber-laser system 603 supplies an annular laser beam 99 to command-and-control targeting output optics and control system 640, which collimates the laser energy into an output beam 82 that can be directed against a target 70.

In some embodiments, the present invention provides an apparatus that includes a grooved first plate; a transparent second plate; and one or more optical fibers held between the first plate and the second plate, wherein each one of the one or more optical fibers has a core and a first cladding layer that surrounds the core, wherein each respective one of the one or more optical fibers has an end facet that reflects light from the core of the respective optical fiber through a first region of the first cladding layer and out of the respective optical fiber and through the transparent second plate, and wherein the first region has a higher index of refraction than a portion of the first cladding layer surrounding the first region.

In some embodiments, the present invention provides an apparatus that includes a grooved first plate; a transparent second plate; and a plurality of optical fibers held between the first plate and the second plate, wherein each one of the plurality of optical fibers has a core and a first cladding layer that surrounds the core, wherein each respective one of the plurality of optical fibers has an end facet that reflects light from the core of the respective optical fiber through a first region of the first cladding layer and out of the respective optical fiber and through the transparent second plate, and wherein the first region has a higher index of refraction than a portion of the first cladding layer surrounding the first region.

In some embodiments of the apparatus, the end facet of each one of the plurality of optical fibers is oriented at substantially a 135-degree angle to a longitudinal axis of the core of that fiber. In other embodiments, the end facet is at an angle of between about 120 degrees and 150 degrees. In some embodiments, the angle is chosen to reflect the signal light at an obtuse angle.

In some embodiments of the apparatus, each one of the plurality of optical fibers has a second cladding layer that has a lower index of refraction than the first cladding layer and that surrounds the first cladding layer.

Some embodiments of the apparatus further include a photonic chip that has a plurality of light ports, wherein each one of the plurality of light ports is aligned to the first region of a corresponding one of the plurality of optical fibers.

Some embodiments of the apparatus further include a photonic chip that has a plurality of optical waveguides in the photonic chip and a plurality of light ports, wherein each one of the plurality of light ports is operatively coupled to an optical waveguide in the photonic chip, and wherein each one of the plurality of light ports is aligned to the first region of one of a corresponding one of the plurality of optical fibers, such that light is transmitted between corresponding ones of the plurality of optical waveguides in the photonic chip and the cores of corresponding ones of the plurality of optical fibers.

Some embodiments of the apparatus further include a photonic chip that has a plurality of light ports, wherein each one of the plurality of light ports is aligned to the first region of a corresponding one of the plurality of optical fibers; and a clamp mechanism surrounding the photonic chip, the transparent second plate, and the grooved first plate, wherein the clamp mechanism is configured to apply at least a first predetermined amount of force and no more than a second predetermined amount of force.

In some embodiments of the apparatus, the first region of each one of the plurality of optical fibers is fused to the transparent second plate.

Some embodiments of the apparatus further include a power supply that supplies electrical power to various controllers and/or optical pumps. Some embodiments of the apparatus further include a laser controller that controls various controllers and/or optical pumps that provide pump energy to optical power amplifiers in the system. Some embodiments of the apparatus further include a laser-signal controller that controls wavelengths and/or beam angles of master oscillators that generate optical seed signals. Some embodiments of the apparatus further include a target imaging and analysis subsystem that determines locations and threat levels of possible targets, and that sends signals to control the laser controller and the direction pointing of output optic system that points the output beam. In some embodiments, the apparatus includes an enclosure. In some embodiments, the apparatus includes a vehicle, naval vessel, or aircraft that transport the laser components of the apparatus.

In some embodiments, the present invention provides a method for making an apparatus that transmits light between corresponding ones of a plurality of optical waveguides in a photonic chip and ones of a plurality of optical fibers operatively coupled to the photonic chip. This method includes providing a grooved first plate; providing a transparent second plate; clamping a plurality of optical fibers between the first plate and the second plate, wherein each one of the plurality of optical fibers has a core and a first cladding layer that surrounds the core; polishing each respective one of the clamped plurality of optical fibers to have an end facet that reflects light from or to the core of the respective one of the clamped plurality of optical fibers through a first region of the first cladding layer and through the transparent second plate; and treating the first region of each one of the clamped plurality of optical fibers such that the first region has a higher index of refraction than a portion of the first cladding layer surrounding the first region.

In some embodiments of the method, the polishing of the end facet of each one of the plurality of optical fibers includes orienting the end facet at a forty-five-degree angle to a longitudinal axis of the core of that fiber.

In some embodiments of the method, each one of the plurality of optical fibers has a second cladding layer that has a lower index of refraction than the first cladding layer and that surrounds the first cladding layer, and the method further includes removing the second cladding layer before the clamping of the plurality of optical fibers between the first plate and the second plate.

Some embodiments of the method further include providing the photonic chip, wherein the photonic chip has a plurality of light ports; aligning the photonic chip with the transparent second plate to align each one of the plurality of light ports to the first region of a corresponding one of the plurality of optical fibers; and affixing the photonic chip, the transparent second plate, the plurality of optical fibers, and the grooved first plate to one another.

Some embodiments of the method further include providing the photonic chip, wherein the photonic chip has a plurality of optical waveguides in the photonic chip and a plurality of light ports; aligning the photonic chip with the transparent second plate to align each one of the plurality of light ports to the first region of one of the plurality of optical fibers; and affixing the photonic chip, the transparent second plate, the plurality of optical fibers, and the grooved first plate to one another such that a first light signal is transmitted from a first one of the plurality of optical fibers into a first one of the plurality of waveguides, and a second light signal is transmitted into a second one of the plurality of optical fibers from a second one of the plurality of waveguides.

Some embodiments of the method further include providing a photonic chip that has a plurality of light ports, wherein each one of the plurality of light ports is aligned to the first region of a corresponding one of the plurality of optical fibers; and clamping the photonic chip, the transparent second plate, and the grooved first plate to one another, wherein the clamping applies at least a first predetermined amount of force and no more than a second predetermined amount of force.

Some embodiments of the method further include fusing the first region of each one of the plurality of optical fibers to the transparent second plate.

In some embodiments, the present invention provides an apparatus for making a device that transmits light between corresponding ones of a plurality of optical waveguides in a photonic chip and ones of a plurality of optical fibers operatively coupled to the photonic chip. This device includes a grooved first plate; a transparent second plate; and a plurality of optical fibers clamped between the first plate and the second plate, wherein each one of the plurality of optical fibers has a core and a first cladding layer that surrounds the core. The apparatus for making includes means for polishing each respective one of the clamped plurality of optical fibers to have an end facet that reflects light from or to the core of the respective one of the clamped plurality of optical fibers through a first region of the first cladding layer and through the transparent second plate; and means for treating the first region of each one of the clamped plurality of optical fibers such that the first region has a higher index of refraction than a portion of the first cladding layer surrounding the first region.

In some embodiments, the device further includes the photonic chip.

In some embodiments, the apparatus for making further includes means for fusing the first region of each one of the clamped plurality of optical fibers to the transparent second plate.

In some embodiments of the apparatus for making, the means for polishing forms the end facet at an angle of less than 135 degrees to a longitudinal axis of the core of that fiber.

In some embodiments of the apparatus for making, the means for polishing forms the end facet at a 135-degree angle to a longitudinal axis of the core of that fiber.

In some embodiments of the device, each one of the plurality of optical fibers has a second cladding layer that has a lower index of refraction than the first cladding layer and that surrounds the first cladding layer, and wherein the apparatus for making further includes means for removing the second cladding layer before the clamping of the plurality of optical fibers between the first plate and the second plate.

In some embodiments, the device further includes the photonic chip, wherein the photonic chip has a plurality of light ports. The apparatus for making includes means for aligning the photonic chip with the transparent second plate to align each one of the plurality of light ports to the first region of a corresponding one of the plurality of optical fibers; and means for affixing the photonic chip, the transparent second plate, the plurality of optical fibers, and the grooved first plate to one another.

In some embodiments, the present invention provides an apparatus that transmits light between corresponding ones of a plurality of optical waveguides in a photonic chip and ones of a plurality of optical fibers operatively coupled to the photonic chip. This apparatus includes a grooved first plate; a transparent second plate; and a plurality of optical fibers clamped between the first plate and the second plate, wherein each one of the plurality of optical fibers has a core and a first cladding layer that surrounds the core; means for reflecting light at ends of each clamped one of the plurality of optical fibers through a first region of the first cladding layer and through the transparent second plate; and means for keeping signal light in the first region and for preventing the signal light from entering the cladding outside the first region. Some embodiments further include the photonic chip. In some embodiments, the first region of each one of the clamped plurality of optical fibers is fused to the transparent second plate. In some embodiments, the means for reflecting reflects light at a 90-degree angle to a longitudinal axis of the core of that fiber. In some embodiments, each one of the plurality of optical fibers has a second cladding layer that has a lower index of refraction than the first cladding layer and that surrounds the first cladding layer, and the second cladding layer is removed from ends of the optical fibers before the plurality of optical fibers are clamped between the first plate and the second plate. Some embodiments further include the photonic chip, wherein the photonic chip has a plurality of light ports; means for aligning the photonic chip with the transparent second plate to align each one of the plurality of light ports to the first region of a corresponding one of the plurality of optical fibers; and means for affixing the photonic chip, the transparent second plate, the plurality of optical fibers, and the grooved first plate to one another. In some embodiments, the means for aligning includes fiducial marks on the device and/or the photonic chip (e.g., in some embodiments, the fiducial marks are metal lines on the transparent plate, or the like).

Embodiments that Omit or Optionally Include the Transparent Second Plate:

In some embodiments, the present invention provides an apparatus that includes a grooved first plate; and a plurality of optical fibers held between the first plate and the second plate, wherein each one of the plurality of optical fibers has a core and a first cladding layer that surrounds the core, wherein each respective one of the plurality of optical fibers has an end facet that reflects light from the core of the respective optical fiber through a first light-guiding region that extends through the first cladding layer and out of the respective optical fiber, and wherein the first light-guiding region has a higher index of refraction than a portion of the first cladding layer surrounding the first light-guiding region.

In some embodiments, the end facet of each one of the plurality of optical fibers is oriented at an obtuse angle smaller than 135 degrees to a longitudinal axis of the core of that fiber.

Some embodiments further include a photonic chip that has a plurality of light ports, wherein each one of the plurality of light ports is aligned to the first region of a corresponding one of the plurality of optical fibers.

Some embodiments further include a photonic chip that has a plurality of optical waveguides in the photonic chip and a plurality of light ports, wherein each one of the plurality of light ports is operatively coupled to an optical waveguide in the photonic chip, and wherein each one of the plurality of light ports is aligned to the first region of one of a corresponding one of the plurality of optical fibers, such that light is transmitted between corresponding ones of the plurality of optical waveguides in the photonic chip and the cores of corresponding ones of the plurality of optical fibers. In some such embodiments, the apparatus further includes a clamp mechanism surrounding the photonic chip, and the grooved first plate, wherein the clamp mechanism is configured to apply at least a first predetermined amount of force and no more than a second predetermined amount of force.

Some embodiments further include a transparent second plate, wherein each respective one of the plurality of optical fibers has an end facet that reflects light from the core of the respective optical fiber through the first light-guiding region of the first cladding layer and out of the respective optical fiber and through a respective light-guiding region of the transparent second plate, and wherein each respective light-guiding region of the transparent second plate has a higher index of refraction than a portion of the transparent second plate surrounding the respective light-guiding region of the transparent second plate. Some such embodiments further include a photonic chip that has a plurality of light ports, wherein each one of the plurality of light ports is aligned to the first region of a corresponding one of the plurality of optical fibers; and a clamp mechanism surrounding the photonic chip, the transparent second plate, and the grooved first plate, wherein the clamp mechanism is configured to apply at least a first predetermined amount of force and no more than a second predetermined amount of force. In some embodiments, the first region of each one of the plurality of optical fibers is fused to the transparent second plate.

In some embodiments, the present invention provides a method for making an apparatus that transmits light between corresponding ones of a plurality of optical waveguides in a photonic chip and ones of a plurality of optical fibers operatively coupled to the photonic chip, the method including: providing a grooved first plate; clamping a plurality of optical fibers to the grooved first plate, wherein each one of the plurality of optical fibers has a core and a first cladding layer that surrounds the core; polishing each respective one of the plurality of optical fibers to have an end facet that reflects light from or to the core of the respective one of the clamped plurality of optical fibers through a first region of the first cladding layer; and treating the first region of each one of the clamped plurality of optical fibers such that the first region has a higher index of refraction than a portion of the first cladding layer surrounding the first region.

In some embodiments of the method, the polishing of the end facet of each one of the plurality of optical fibers includes forming the end facet at a forty-five-degree angle to a longitudinal axis of the core of that fiber.

Some embodiments of the method further include providing a transparent second plate; and treating a plurality of regions of the transparent second plate to form a plurality of light-guiding waveguides therethrough such that each respective one of the plurality of light-guiding waveguides of the transparent second plate is aligned to a respective one of the plurality of optical fibers.

Some embodiments of the method further include providing the photonic chip, wherein the photonic chip has a plurality of light ports; aligning the photonic chip with the transparent second plate to align each one of the plurality of light ports to the first region of a corresponding one of the plurality of optical fibers; and affixing the photonic chip, the transparent second plate, the plurality of optical fibers, and the grooved first plate to one another.

Some embodiments of the method further include providing the photonic chip, wherein the photonic chip has a plurality of optical waveguides in the photonic chip and a plurality of light ports; aligning the photonic chip with the transparent second plate to align each one of the plurality of light ports to the first region of one of the plurality of optical fibers; and affixing the photonic chip, the transparent second plate, the plurality of optical fibers, and the grooved first plate to one another such that a first light signal is transmitted from a first one of the plurality of optical fibers into a first one of the plurality of waveguides, and a second light signal is transmitted into a second one of the plurality of optical fibers from a second one of the plurality of waveguides.

Some embodiments of the method further include providing a photonic chip that has a plurality of light ports, wherein each one of the plurality of light ports is aligned to the first region of a corresponding one of the plurality of optical fibers; and clamping the photonic chip, the transparent second plate, and the grooved first plate to one another, wherein the clamping applies at least a first predetermined amount of force and no more than a second predetermined amount of force.

Some embodiments of the method further include fusing the first region of each one of the plurality of optical fibers to the transparent second plate.

In some embodiments, the present invention provides an apparatus that transmits light between corresponding ones of a plurality of optical waveguides in a photonic chip and ones of a plurality of optical fibers operatively coupled to the photonic chip. This apparatus includes a grooved first plate; a plurality of optical fibers clamped to the grooved first plate, wherein each one of the plurality of optical fibers has a core and a first cladding layer that surrounds the core; means for reflecting light at ends of each clamped one of the plurality of optical fibers through a first region of the first cladding layer; and means for guiding signal light in the first region and for preventing the signal light from entering the cladding outside the first region.

Some embodiments of the apparatus further include the photonic chip.

Some embodiments of the apparatus further include a transparent second plate, wherein the first region of each one of the clamped plurality of optical fibers is fused to the transparent second plate.

In some embodiments, the means for reflecting reflects light at an obtuse angle to a longitudinal axis of the core of that fiber.

Some embodiments of the apparatus further include a transparent second plate; a plurality of means for guiding light through the transparent second plate; the photonic chip, wherein the photonic chip has a plurality of light ports; means for aligning the photonic chip with the plurality of means for guiding light through the transparent second plate to align each one of the plurality of light ports to the first region of a corresponding one of the plurality of optical fibers; and means for affixing the photonic chip, the transparent second plate, the plurality of optical fibers, and the grooved first plate to one another.

Some embodiments of the apparatus further include a transparent second plate; the photonic chip, wherein the photonic chip has a plurality of light ports; means for aligning the photonic chip with the transparent second plate to align each one of the plurality of light ports to the first region of a corresponding one of the plurality of optical fibers; and means for affixing the photonic chip, the transparent second plate, the plurality of optical fibers, and the grooved first plate to one another.

In some embodiments, for each one of the above-described embodiments that have a plurality of optical fibers, other similar embodiments use just one single optical fiber, and the grooved plate in some such embodiments has just a single groove.

It is specifically contemplated that the present invention includes embodiments having combinations and subcombinations of the various embodiments and features that are individually described herein (i.e., rather than listing every combinatorial of the elements, this specification includes descriptions of representative embodiments and contemplates embodiments that include some of the features from one embodiment combined with some of the features of another embodiment). It also is specifically contemplated that some embodiments of the invention include supersets and/or subsets of the embodiments and combinations described herein combined with one or more embodiments of the patents, patent applications, and provisional patent applications listed herein, which are all hereby incorporated herein by reference. Further, some embodiments include fewer than all the components described as part of any one of the embodiments described herein.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," " "second," and "third," etc., are used merely as labels, and are not intended to impose numerical requirements on their objects.

What is claimed is:

1. An apparatus comprising:
    a grooved first plate and a second plate; and
    one or more optical fibers held between the first grooved plate and the second plate, wherein each one of the one or more optical fibers has a core and a first cladding layer that surrounds the core, wherein each respective one of the one or more optical fibers has an end facet that reflects light from the core of the respective optical fiber through a first light-guiding region that extends through the first cladding layer and out of the respective optical fiber, wherein the first light-guiding region has a higher index of refraction than a portion of the first cladding layer surrounding the first light-guiding region, and wherein the end facet of each respective one of the one or more optical fibers is oriented at an obtuse angle of other than 135 degrees to a longitudinal axis of the core of that respective fiber.

2. The apparatus of claim 1, wherein the obtuse angle is less than 135 degrees to the longitudinal axis of the core of that respective fiber.

3. The apparatus of claim 1, wherein the one or more optical fibers includes a plurality of optical fibers, the apparatus further comprising:

a photonic chip that has a plurality of light ports, wherein each one of the plurality of light ports is aligned to the first region of a corresponding one of the plurality of optical fibers.

4. The apparatus of claim 1, wherein the one or more optical fibers includes a plurality of optical fibers, the apparatus further comprising:
a photonic chip that has a plurality of optical waveguides in the photonic chip and a plurality of light ports, wherein each one of the plurality of light ports is operatively coupled to an optical waveguide in the photonic chip, and wherein each one of the plurality of light ports is aligned to the first region of one of a corresponding one of the plurality of optical fibers, such that light is transmitted between corresponding ones of the plurality of optical waveguides in the photonic chip and the cores of corresponding ones of the plurality of optical fibers.

5. The apparatus of claim 1, wherein the second plate is transparent, wherein each respective one of the one or more optical fibers has an end facet that reflects light from the core of the respective optical fiber through the first light-guiding region of the first cladding layer and out of the respective optical fiber and through a respective light-guiding region of the transparent second plate, and wherein each respective light-guiding region of the transparent second plate has a higher index of refraction than a portion of the transparent second plate surrounding the respective light-guiding region of the transparent second plate.

6. The apparatus of claim 5, wherein the one or more optical fibers includes a plurality of optical fibers, the apparatus further comprising:
a photonic chip that has a plurality of light ports, wherein each one of the plurality of light ports is aligned to the first region of a corresponding one of the plurality of optical fibers; and
a clamp mechanism surrounding the photonic chip, the transparent second plate, and the grooved first plate, wherein the clamp mechanism is configured to apply at least a first predetermined amount of force and no more than a second predetermined amount of force.

7. The apparatus of claim 5, wherein the first region of each one of the plurality of optical fibers is fused to the transparent second plate.

8. A method for making an apparatus that transmits light between corresponding ones of one or more optical waveguides in a photonic chip and ones of one or more optical fibers operatively coupled to the photonic chip, the method comprising:
providing a grooved first plate;
clamping one or more optical fibers to the grooved first plate, wherein each one of the one or more optical fibers has a core and a first cladding layer that surrounds the core;
polishing each respective one of the clamped one or more optical fibers to have an end facet that reflects light from or to the core of the respective one of the clamped one or more optical fibers through a first region of the first cladding layer, wherein the polishing of the end facet of each respective one of the one or more optical fibers includes forming the end facet at an obtuse angle of other than 135 degrees to a longitudinal axis of the core of that respective fiber; and
treating the first region of each one of the clamped one or more optical fibers such that the first region has a higher index of refraction than a portion of the first cladding layer surrounding the first region.

9. The method of claim 8, wherein the obtuse angle is less than 135 degrees to the longitudinal axis of the core of that respective fiber.

10. The method of claim 8, method further comprising:
providing a transparent second plate; and
treating one or more regions of the transparent second plate to form one or more light-guiding waveguides therethrough such that each respective one of the one or more light-guiding waveguides of the transparent second plate is aligned to a respective one of the one or more optical fibers.

11. The method of claim 10, wherein the one or more optical fibers includes a plurality of optical fibers, the method further comprising:
providing the photonic chip, wherein the photonic chip has a plurality of light ports;
aligning the photonic chip with the transparent second plate to align each one of the plurality of light ports to the first region of a corresponding one of the plurality of optical fibers; and
affixing the photonic chip, the transparent second plate, the plurality of optical fibers, and the grooved first plate to one another.

12. The method of claim 10, wherein the one or more optical fibers includes a plurality of optical fibers, the method further comprising:
providing the photonic chip, wherein the photonic chip has a plurality of optical waveguides in the photonic chip and a plurality of light ports;
aligning the photonic chip with the transparent second plate to align each one of the plurality of light ports to the first region of one of the plurality of optical fibers; and
affixing the photonic chip, the transparent second plate, the plurality of optical fibers, and the grooved first plate to one another such that a first light signal is transmitted from a first one of the plurality of optical fibers into a first one of the plurality of waveguides, and a second light signal is transmitted into a second one of the plurality of optical fibers from a second one of the plurality of waveguides.

13. The method of claim 10, wherein the one or more optical fibers includes a plurality of optical fibers, the method further comprising:
providing a photonic chip that has a plurality of light ports, wherein each one of the plurality of light ports is aligned to the first region of a corresponding one of the plurality of optical fibers; and
clamping the photonic chip, the transparent second plate, and the grooved first plate to one another, wherein the clamping applies at least a first predetermined amount of force and no more than a second predetermined amount of force.

14. The method of claim 10, wherein the one or more optical fibers includes a plurality of optical fibers, the method further comprising:
fusing the first region of each one of the plurality of optical fibers to the transparent second plate.

15. An apparatus that transmits light between corresponding ones of a plurality of optical waveguides in a photonic chip and ones of a plurality of optical fibers operatively coupled to the photonic chip, the apparatus comprising:
a grooved first plate;
one or more optical fibers clamped to the grooved first plate, wherein each one of the one or more optical fibers has a core and a first cladding layer that surrounds the core;

means for reflecting light at ends of each clamped one of the one or more optical fibers through a first region of the first cladding layer, wherein the means for reflecting reflects light at an obtuse angle to a longitudinal axis of the core of each clamped one of the one or more optical fibers; and means for guiding signal light in the first region and for preventing the signal light from entering the cladding outside the first region.

16. The apparatus of claim 15, further comprising the photonic chip.

17. The apparatus of claim 15, further comprising:
a transparent second plate, wherein the first region of each one of the clamped one or more optical fibers is fused to the transparent second plate.

18. The apparatus of claim 15, wherein the one or more optical fibers includes a plurality of optical fibers, the apparatus further comprising:
a transparent second plate;
a plurality of means for guiding light through the transparent second plate;
the photonic chip, wherein the photonic chip has a plurality of light ports;
means for aligning the photonic chip with the plurality of means for guiding light through the transparent second plate to align each one of the plurality of light ports to the first region of a corresponding one of the plurality of optical fibers; and
means for affixing the photonic chip, the transparent second plate, the plurality of optical fibers, and the grooved first plate to one another.

19. The apparatus of claim 15, wherein the one or more optical fibers includes a plurality of optical fibers, the apparatus further comprising:
a transparent second plate;
the photonic chip, wherein the photonic chip has a plurality of light ports;
means for aligning the photonic chip with the transparent second plate to align each one of the plurality of light ports to the first region of a corresponding one of the plurality of optical fibers; and
means for affixing the photonic chip, the transparent second plate, the plurality of optical fibers, and the grooved first plate to one another.

20. The apparatus of claim 1, wherein the obtuse angle is more than 135 degrees to the longitudinal axis of the core of that respective fiber.

21. The method of claim 8, wherein the obtuse angle is more than 135 degrees to the longitudinal axis of the core of that respective fiber.

22. The apparatus of claim 1, wherein the one or more optical fibers includes a plurality of optical fibers, the apparatus further comprising:
a photonic chip that has a plurality of optical waveguides in the photonic chip and a plurality of light ports, wherein each one of the plurality of light ports is operatively coupled to an optical waveguide in the photonic chip, and wherein each one of the plurality of light ports is aligned to the first region of one of a corresponding one of the plurality of optical fibers, such that light is transmitted between corresponding ones of the plurality of optical waveguides in the photonic chip and the cores of corresponding ones of the plurality of optical fibers;
wherein the apparatus is part of a system that includes:
a plurality of external seed sources operatively coupled to the plurality of optical fibers and configured to generate a plurality of seed signals that are transmitted through the plurality of optical fibers and into the photonic chip such that a plurality of output signals is produced, and
a spectral-beam combiner (SBC) configured to combine the plurality of output signals into a single combined beam.

23. The method of claim 8, further comprising:
coupling a plurality of output signals generated by the photonic chip into a spectral-beam combiner (SBC); and
using the SBC, combining the plurality of output signals into a single combined beam.

24. The apparatus of claim 15, further comprising:
means for combining a plurality of output signals generated by the photonic chip into a single combined beam.

25. The apparatus of claim 1, further comprising:
laser components operatively coupled to the one or more optical fibers; and
a vehicle that transports the apparatus.

26. The apparatus of claim 1, further comprising:
laser components operatively coupled to the one or more optical fibers; and
a naval vessel that transports the apparatus.

27. The apparatus of claim 1, further comprising:
laser components operatively coupled to the one or more optical fibers; and
an aircraft that transports the apparatus.

* * * * *

UNITED STATES PATENT AND TRADEMARK OFFICE
CERTIFICATE OF CORRECTION

PATENT NO. : 10,495,820 B1  
APPLICATION NO. : 13/999557  
DATED : December 3, 2019  
INVENTOR(S) : Gregory J. Whaley Page 1 of 1

It is certified that error appears in the above-identified patent and that said Letters Patent is hereby corrected as shown below:

In the Drawings

On Sheet 2, as the uppermost reference number on the left side of Figure 3: Delete "43" and insert -- 143 -- therefor.

Signed and Sealed this  
Twenty-first Day of January, 2020

Andrei Iancu  
*Director of the United States Patent and Trademark Office*